United States Patent
Ueda et al.

(10) Patent No.: US 6,711,893 B2
(45) Date of Patent: Mar. 30, 2004

(54) FUEL SUPPLY APPARATUS FOR AN INTERNAL COMBUSTION ENGINE

(75) Inventors: Takanori Ueda, Susono (JP); Takeshi Okumura, Sosono (JP); Yoshihiro Iwashita, Suntoh-gun (JP); Kazuhiro Akihama, Aichi-gun (JP); Masahiro Taki, Aichi-gun (JP); Satoshi Yamazaki, Aichi-gun (JP); Walter Weissman, Basking Ridge, NJ (US); Bhupender S. Minhas, Bel Air, MD (US)

(73) Assignees: Toyota Jidosha Kabushiki Kaisha, Toyota (JP); ExxonMobil Research and Engineering Co., Annandale, NJ (US)

( * ) Notice: Subject to any disclaimer, the term of this patent is extended or adjusted under 35 U.S.C. 154(b) by 77 days.

(21) Appl. No.: 09/947,384

(22) Filed: Sep. 7, 2001

(65) Prior Publication Data

US 2002/0139111 A1 Oct. 3, 2002

Related U.S. Application Data

(60) Provisional application No. 60/278,760, filed on Mar. 27, 2001.

(51) Int. Cl.⁷ .................................. F01N 3/00
(52) U.S. Cl. ..................... 60/285; 60/283; 60/284; 60/286; 123/1 A; 123/3; 123/304

(58) Field of Search ................. 60/285, 283, 284, 60/286, 300; 123/1 A, 3, 304, 491, 575, 576, 577

(56) References Cited

U.S. PATENT DOCUMENTS

| 4,370,150 A | * | 1/1983 | Fenstermaker | 95/49 |
| 6,161,386 A | * | 12/2000 | Lokhandwala | 60/649 |
| 6,318,306 B1 | * | 11/2001 | Komatsu | 123/3 |
| 6,332,448 B1 | * | 12/2001 | Iiyama et al. | 123/304 |

FOREIGN PATENT DOCUMENTS

| JP | 5-312115 A | 11/1993 | |
| JP | 2000-329013 | * 11/2000 | 123/1 A |

* cited by examiner

Primary Examiner—Binh Tran
(74) Attorney, Agent, or Firm—Oliff & Berridge, PLC

(57) ABSTRACT

A gasoline in a material fuel tank is separated into a high-RON fuel having a higher octane value than the material fuel and a low-RON fuel having a lower octane value than the material fuel, by a separator device equipped with a separation membrane. Using a fuel switching mechanism, one or both of the high-RON fuel and the low-RON fuel are supplied to the engine in accordance with the state of operation of the engine. As the octane value of a fuel can be changed in accordance with the engine operation state, the state of combustion in the engine improves, so that both an increase in engine output and an improvement in an exhaust property can be achieved.

24 Claims, 9 Drawing Sheets

Fig.3
(A) 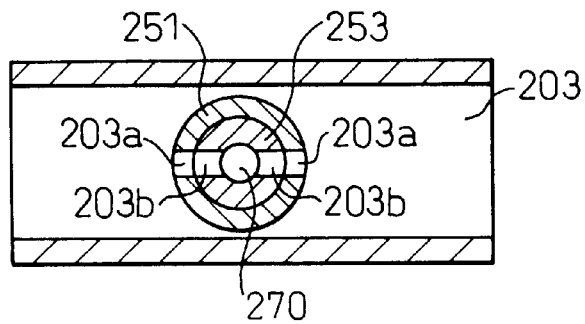
(B) 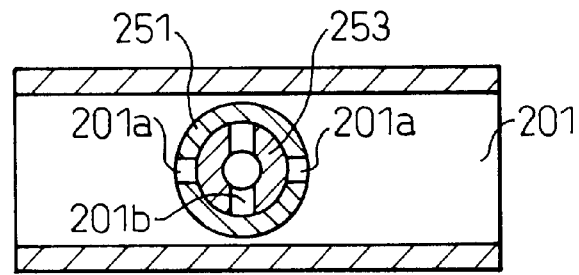
(C) 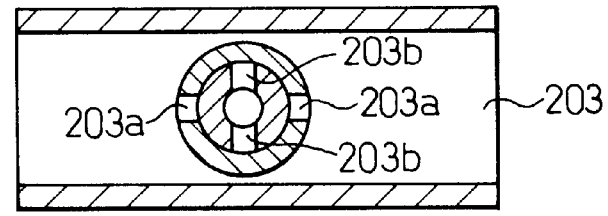
(D) 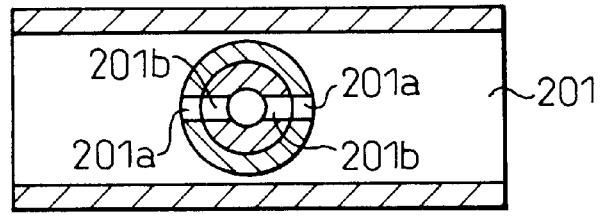

FUEL SUPPLY APPARATUS FOR AN INTERNAL COMBUSTION ENGINE

BACKGROUND OF THE INVENTION

1. Field of the Invention

The invention relates to a fuel supply apparatus for an internal combustion engine and, more particularly, to a fuel supply apparatus having a separation membrane that separates a material fuel into a high-octane fuel and a low-octane fuel.

2. Description of the Related Art

As an example of an art for separating a fuel (a fuel serving as a material fuel) using a separation membrane and supplying the separated fuels, having properties different from the material fuel, to an internal combustion engine is described in the Japanese Unexamined Patent Publication (Kokai) No. 5-312115. An apparatus of the '115 publication separates gasoline in a gasoline tank into a fuel having a low-boiling point (a low-boiling fuel) and a fuel having a high-boiling point (a high-boiling fuel) by using a pervaporation membrane, and stores the obtained low-boiling fuel in a fuel tank. At the time of a startup of the engine or a cold operation thereof, the apparatus supplies the low-boiling fuel stored in the fuel tank to the engine. The apparatus of the publication performs the startup or cold operation of the engine by using the low-boiling fuel separated from the material fuel during operation of the engine, so as to improve the startup characteristic of the engine, and the property of the exhaust gas, during the cold operation.

Since the low-boiling fuel is separated from an ordinary gasoline in the apparatus of the '115 publication mentioned above, the apparatus is able to obtain the low-boiling fuel from an ordinary gasoline without needing a separate supply of a low-boiling fuel, and can improve the startup characteristic of the engine and the property of the exhaust gas, during the cold operation, by using the low-boiling fuel.

However, although the apparatus of the aforementioned publication uses the low-boiling fuel separated from gasoline, the apparatus returns the fuel remaining, after separation of the low-boiling fuel, to the gasoline tank, and mixes it with the material fuel.

If a fuel containing a large amount of low-boiling components is separated (extracted) from a gasoline through the use of a separation membrane, the remnant fuel is a high-boiling fuel having a larger content of high-boiling components than the material fuel. However, with regard to the aforementioned apparatus, only the use of the low-boiling fuel for startup of the engine is taken into consideration, and the use of the high-boiling fuel is not considered at all.

Therefore, the high-boiling fuel produced by the separation membrane is not utilized, but is mixed with the material fuel in the gasoline tank. Furthermore, if a large amount of the low-boiling fuel is produced, the amount of the high-boiling fuel refluxed to the material fuel also becomes large, and therefore it is a conceivable that all the fuel in the gasoline tank will have an increased content of the high-boiling component. In the apparatus of the '115 publication, however, the amount of the low-boiling fuel needed is smaller than the amount of fuel provided within the gasoline tank since the low-boiling fuel is used only at the time of startup of the engine or cold operation thereof. Therefore, the amount of the high-boiling fuel produced as a byproduct of the low-boiling fuel is small, and the boiling point of the fuel within the tank does not significantly change from the boiling point of the material fuel despite high-boiling fuel being mixed with the fuel within the gasoline tank.

That is, the apparatus of the '115 publication uses only the low-boiling fuel, but does not effectively use the high-boiling fuel separated by consuming energy. About a half of the energy used for fuel separation is uselessly consumed. Furthermore, in the apparatus of the '115 publication, the separated low-boiling fuel is used only at the time of startup of the engine or the time of cold operation, but is not used at the time of ordinary operation after warm-up of the engine. Therefore, there is a problem that the separated fuel is not effectively used.

SUMMARY OF THE INVENTION

In view of the aforementioned problem of the conventional art, it is an object of the invention to improve the performance of an engine or the property of exhaust gas and prevent useless consumption of energy for fuel separation, in a case where two kinds of fuels having different properties are separated from a material fuel through the use of a separation membrane, by selectively using the two fuels in accordance with the state of operation of the engine.

According to the present invention, there is provided a fuel supply apparatus for an internal combustion engine comprising: a separation membrane for separating a fuel supplied as a material fuel into a high-octane fuel containing a larger amount of a component of a high octane value than the material fuel and a low-octane fuel containing a larger amount of a component of a low octane value than the material fuel; and a high-octane fuel supply passage and a low-octane fuel supply passage that are independent from each other and that are capable of supplying the high-octane fuel and the low-octane fuel, after separation, respectively, separately to the internal combustion engine, the fuel supply apparatus for the internal combustion engine being characterized by supplying one or both of the high-octane fuel and the low-octane fuel to the internal combustion engine in accordance with an engine operation condition.

That is, in the present invention, the material fuel is separated into the high-octane fuel containing a large amount of a high-octane component and a low-octane fuel containing a low-octane component. Since one or both of the separated low-octane fuel and the separated high-octane fuel are supplied to the internal combustion engine in accordance with the engine operation condition, not only one of the separated fuels (e.g., the low-octane fuel) but also the other separated fuel (e.g., the high-octane fuel) is effectively used. Furthermore, since it becomes possible to change the octane value of fuel in accordance with the operation state of the engine, the engine performance, such as output or the like, and the property of the exhaust, are improved.

The separation membrane can be a type which allows components in the material fuel having octane values within a predetermined range to permeate through the membrane. Further, permeability control means for controlling the amount and/or property of the fuel composed of the components permeated through the membrane may be used. The permeability control means controls the operation condition of the membrane which affects the permeation of the fuel components through the membrane such as pressures on both sides of the membrane and the supply rate of the material fuel and temperature of the material fuel or the separation membrane.

BRIEF DESCRIPTION OF THE DRAWINGS

FIGS. 3(A) through 3(D) are section views illustrating the operation of the switching mechanism of FIG. 2.

DETAILED DESCRIPTION OF THE PREFERRED EMBODIMENT

Embodiments of the invention will be described hereinafter with reference to the accompanying drawings.

Figure 1:
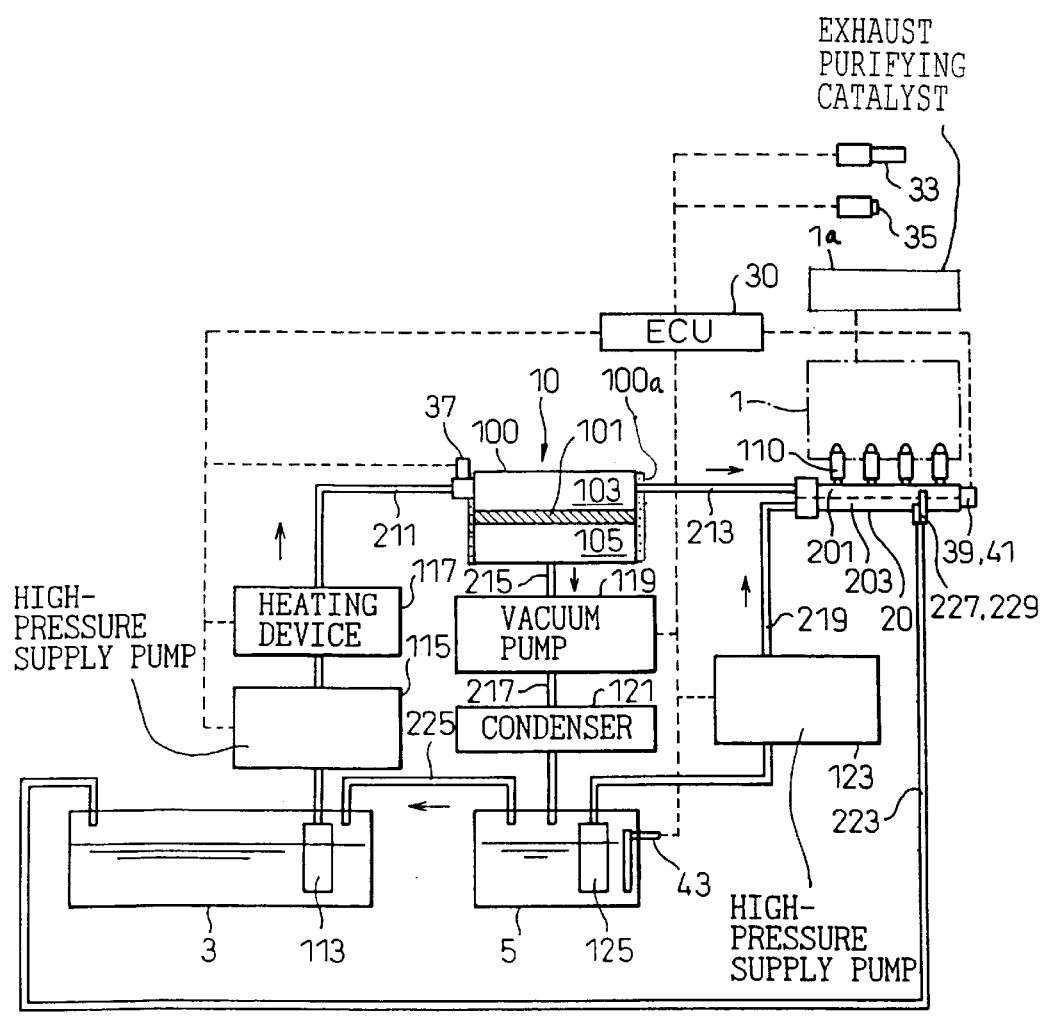
FIG. 1 is a diagram schematically illustrating a construction of an embodiment in which the fuel supply apparatus of the invention is applied to an automobile internal combustion engine.

FIG. 1 is a diagram schematically illustrating a construction of an embodiment in which the fuel supply apparatus of the invention is applied to an automobile internal combustion engine.

In FIG. 1, 1 represents an internal combustion engine, and 110 represents fuel injection valves that inject fuel to cylinders of the internal combustion engine 1. The fuel injection valves 110 are connected to a dual delivery pipe 20 described later. In this embodiment, each fuel injection valve 110 is capable of selectively injecting one fuel from each of two delivery passages 201, 203 formed in the dual delivery pipe 20 into a corresponding one of the cylinders of the internal combustion engine 1 or simultaneously injecting the fuels from both passages into the corresponding cylinder at a predetermined mixture ratio. The construction of the dual delivery pipe 20 and a fuel switching mechanism of the fuel injection valves 110 will be described later.

In FIG. 1, 3 is a fuel tank for storing a fuel (gasoline). The tank 3 is supplied with and stores an ordinary (commercially available) gasoline. In this specification, the gasoline stored in the fuel tank 3 is referred to as material fuel in order to distinguish it from a separated fuel described later.

In this embodiment, a separator device 10 is provided for separating the material fuel supplied from the fuel tank 3 into two kinds of fuels that have different properties.

The separator device 10 has a housing 100 formed as a pressure vessel. The interior of the housing 100 is divided into two sections 103 and 105 by an aroma separation membrane 101.

As the aroma separation membrane 101, a membrane having a property that allows selective permeation of an aromatic component of the gasoline is used. That is, if the material fuel is supplied at a relatively high pressure to one side of the aroma separation membrane 101 (e.g., the side of the section 103) and a relatively low pressure is maintained on the other side (e.g., the side of the section 105), mainly the aromatic components of the material fuel permeate into the separation membrane 101, and effuses to the low pressure-side (the section 105-side) surface of the membrane 101, and therefore covers the membrane surface facing the low pressure side.

By removing the effused fuel oil covering the low pressure-side membrane surface, effusion of the aromatic component through the aroma separation membrane 101 to the low pressure side continuously occurs. In this embodiment, by keeping the pressure on the low pressure side (the section 105 side) at a pressure (negative pressure) that is lower than the vapor pressure of the effused fuel oil, the effused fuel oil covering the low pressure-side membrane surface and containing a large amount of aromatic component is continuously removed from the surface so that it is collected in the form of a fuel vapor.

As is well known in the art, if the amount of aromatic components in gasoline increases, the octane value of gasoline (research octane number, hereinafter abbreviated as "RON") increases. Therefore, a separated fuel recovered from the low pressure side of the separation membrane and containing a large amount of aromatic components has an octane value that is higher than the octane value of the material fuel, and a separated fuel having a low content of aromatic components and having a lower octane value than the material fuel remains on the high pressure side of the separation membrane.

That is, if the material fuel is supplied to the high pressure-side section 103 of the separator device 10, a high-octane fuel (high-RON fuel) having a higher octane value than the material fuel is recovered from the low pressure-side section 105 in the form of a vapor, and a low-octane fuel (low-RON fuel) having a lower octane value than the material fuel is recovered from the high pressure-side section 105. That is, if the material fuel is supplied to the separator device 10, the material fuel is separated into the high-RON fuel and the low-RON fuel.

In the embodiment, an improvement in the engine performance and in the property of exhaust are achieved by switching (or by using a mixture of) the high-RON fuel and the low-RON fuel in accordance with the state of operation of the engine. Since a low-octane fuel (low-RON fuel) is very good in ignition quality, the use of the low-RON fuel at the time of startup of the engine or cold operation thereof, for example, achieves an improved performance of the engine and an improved property of the exhaust. On the other hand, a high-octane fuel does not readily undergo self-ignition. Therefore, by using the high-octane fuel at the time of high-output operation, the ignition timing of the engine can be largely advanced, and thereby the output of the engine is increased.

The amounts and properties (octane values) of the high-RON fuel and the low-RON fuel separated vary depending on conditions of operation of the separation membrane, for example, the temperature of the separation membrane (more precisely, the contact temperature of the material fuel and the separation membrane), the amount of flow of the material fuel supplied, the pressure in the high pressure-side section, the pressure (negative pressure) in the low pressure-side section, etc.

Among the aforementioned operation conditions, the separation membrane temperature can be adjusted by controlling the temperature of the material fuel supplied to the separation membrane. Therefore, in this embodiment, the supply passage of the material fuel to the separator device 10 is provided with a heater, a heat exchanger, or the like, whereby the material fuel supply temperature is controlled to adjust the separation membrane temperature. The pressure in the high-pressure section 103 and the pressure in the low pressure-side section 105 are adjusted by pressurizing the material fuel through the use of a high-pressure supply pump 115 and by reducing the pressure in the low pressure-side section 105 by connecting thereto a vacuum pump 119, respectively.

A fuel separating operation of the embodiment of FIG. 1 will be described below.

In FIG. 1, the material fuel (gasoline) stored in the fuel tank 3 is delivered to a high-pressure supply pump 115 by a low-pressure feed pump 113. After being pressurized to a predetermined pressure by the high-pressure supply pump 115, the material fuel is heated to a predetermined temperature while flowing through a heating device 117, such as a heater, a heater exchanger or the like. After that, the material fuel is sent, under pressure, from a supply passage 211 to the high pressure-side section 103 of the separator device 10.

Although, in this embodiment, an electric heater is used as the heating device 117 taking into consideration the heating of the material fuel at the time of startup of the engine, it is also possible to use a heat exchanger that exchanges heat between the engine exhaust gas or cooling water and the material fuel in place of the electric heater, or in addition to the electric heater, in order to heat the material fuel.

Of the high-temperature and high-pressure material fuel supplied from the supply passage 211 to the high pressure-side section 103, mainly aromatic components permeate into the aroma separation membrane 101, and effuse into the low pressure-side section. Therefore, the amount of aromatic components in the fuel flowing in the high pressure-side section 103 decreases toward the downstream end. Hence, the separated fuel flowing out of the high pressure-side section 103 of the separator device 10 is a low-RON fuel having a lower octane value than the material fuel.

The low-RON fuel flowing out of the high pressure-side section 103 is supplied to a low-RON fuel injection passage (low-RON fuel rail) 201 of the delivery pipe 20 via a low-octane fuel supply passage 213.

On the other hand, the fuel oil (high-RON fuel) effusing to the low pressure-side section 105 of the separator device 10 and containing a large amount of aromatic components covers the low pressure-side surface of the separation membrane 101. In a state where the low pressure-side surface of the separation membrane 101 is entirely covered with the high-RON fuel, the aromatic component concentration on the high pressure-side section 103-side surface of the separation membrane 101 becomes high, so that the permeation speed of the aromatic components effused from the high pressure side to the low pressure side through the separation membrane 101 considerably drops. In order to prevent this in the embodiment, a vacuum pump 119 is connected to the low pressure-side section 105 of the separator device 10 via a recovery passage 215, whereby a high-RON fuel vapor in the low pressure-side section 105 is discharged from the low pressure-side section 105. Therefore, the pressure in the low pressure-side section 105 is kept at a pressure (preferably, a negative pressure) that is lower than the vapor pressure of the high-RON fuel effused thereinto. Hence, the high-RON fuel effused to the low pressure-side surface of the separation membrane 101 immediately evaporates and is recovered into the recovery passage, and the aromatic components continuously permeate through the separation membrane 101 from the high pressure side to the low pressure side.

The high-RON fuel vapor drawn from the low pressure-side section 105 of the separator device 10 by the vacuum pump 119 is condensed into a high-RON fuel liquid by a (water-cooled or air-cooled) condenser 121 provided on an ejection piping 217 of the pump 119. In FIG. 1, 5 represents a subsidiary tank for temporarily storing the high-RON fuel liquefied by the condenser 121.

The high-RON fuel stored in the subsidiary tank 5 is supplied to a high-RON fuel injection passage (high-RON fuel rail) 203 of the dual delivery pipe 20 via a high-octane fuel supply passage 219 by a high-pressure supply pump (fuel injection pump) 123 and, if required, by a feed pump 125.

In this embodiment, the subsidiary tank 5 and the fuel tank 3 are connected by an overflow pipe 225. If the liquid surface of the high-RON fuel in the subsidiary tank rises and exceeds an upper limit value, an excess amount of the high-RON fuel is refluxed from the subsidiary tank 5 to the fuel tank 3 via the overflow pipe 225.

In FIG. 1, 30 indicates an electronic control unit (ECU) of the engine 1. In this embodiment, the ECU 30 is formed as a microcomputer having a known construction in which a read-only memory (ROM), a random access memory (RAM), an arithmetic unit (CPU), and input/output ports are connected by a bi-directional bus. The ECU 30 performs basic controls such as a fuel injection control, an ignition timing control, etc. Furthermore, in this embodiment, the ECU 30 performs a separating process control for controlling the amount of a separated fuel produced, the property thereof, etc., by adjusting the condition of operation of the separator device, as described below, and also performs various operations, such as the switching between separated fuels for supply to the engine, detection of the property (octane value or the like) of the separated fuels, etc.

For these controls, parameters indicating the states of operation of the engine, such as the engine revolution speed, the amount of intake air, the amount of depression of an accelerator pedal by a driver (amount of accelerator operation), etc., are inputted to the ECU 30 from various sensors, such as an engine revolution speed sensor, an engine intake amount sensor, an accelerator operation amount sensor, etc. Furthermore, an air-fuel ratio signal indicating the engine exhaust air-fuel ratio is inputted to the ECU 30 from an air-fuel ratio sensor 33 disposed in an engine exhaust passage. Still further, a knock sensor 35 for detecting knocking of the engine is disposed on a cylinder block (not shown) of the engine 1. The knock sensor 35 is a sensor that detects vibrations of a frequency specific to knocking of the engine. Outputs of the knock sensor 35 are supplied to the ECU 30. As described below, the embodiment detects the property (the octane value) of the separated fuel based on an operation condition at the time of knocking of the engine 1 detected by the knock sensor 35.

Still further, in the embodiment, an inlet portion of the separator device 10 connected to the supply passage 211 is provided with a fuel temperature sensor 37 for detecting the temperature of the material fuel supplied thereto. The fuel rails 201, 203 of the dual delivery pipe 20 are provided with fuel pressure sensors 39, 41 for detecting fuel pressures in the rails. The subsidiary tank 5 is provided with a level sensor 43 for detecting the height of the fuel liquid surface in the tank. Outputs of these sensors are also supplied to the ECU 30. The control of the ECU 30 using these sensors is described later.

Still further, the heating device 117 and the high-pressure supply pump 115 provided on the material fuel supply passage 211, and the vacuum pump 119 provided on the separated fuel recovery passage 215, the high-pressure supply pump 123 for the high-RON fuel, the low-pressure feed pumps 113, 119 provided on the tanks 3, 5 are connected to the ECU 30. The operations thereof are controlled by the ECU 30.

The dual delivery pipe 20 and a fuel switching mechanism 21 of the fuel injection valve 110 will be described next.

Figure 2:
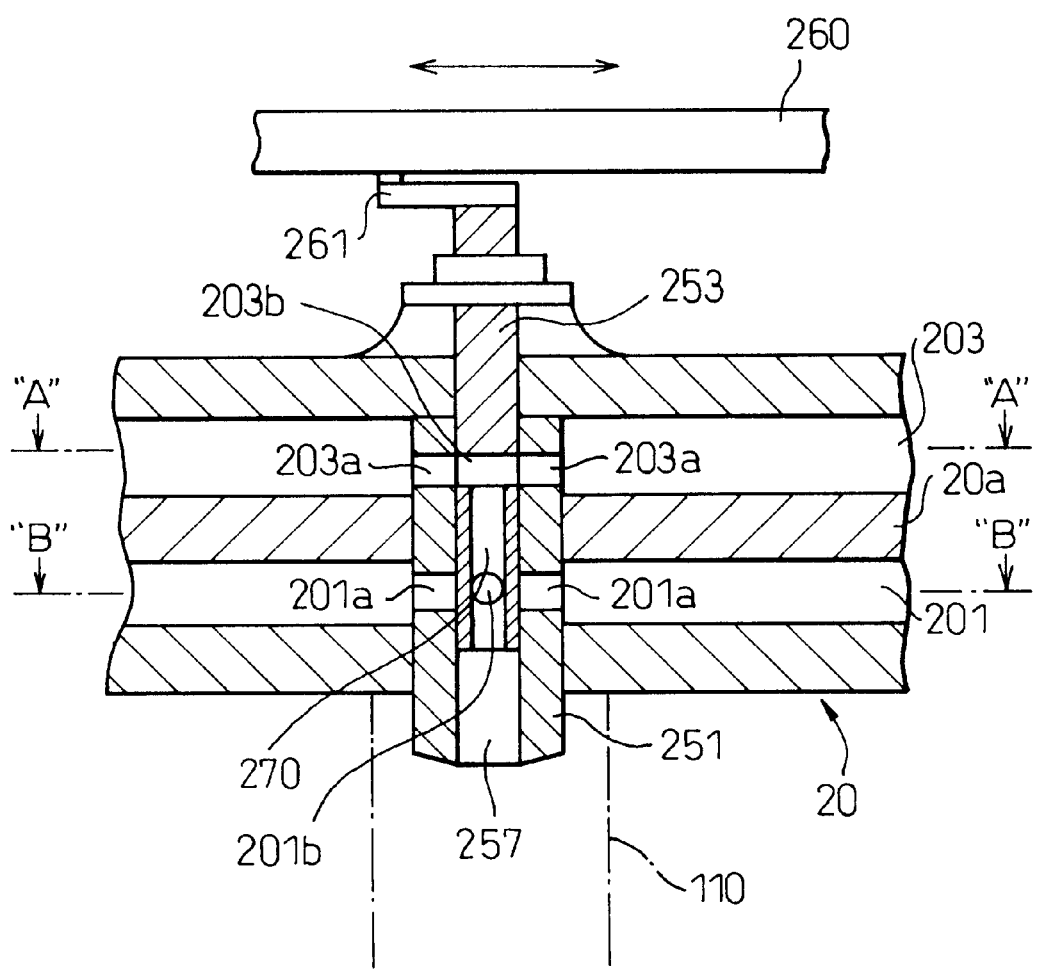
FIG. 2 is a section view illustrating a fuel switching mechanism for selectively supplying a high-octane fuel and a low-octane fuel to the engine.

FIG. 2 is a sectional view illustrating the constructions of the dual delivery pipe 20 and the fuel switching mechanism 21 of the fuel injection valve 110. In the dual delivery pipe 20, two rails (the low-RON fuel rail 201 and the high-RON fuel rail 203) are formed by a partition wall 20a extending in the direction of the length of the dual delivery pipe 20. The rails 201 and 203 have functions of storing the high-pressure low-RON fuel and the high-pressure high-RON fuel supplied thereto and delivering to the fuel injection valves 110 of the cylinders.

In the embodiment, the fuel switching mechanism has an injector guide 251 provided for each fuel injection valve 110, and a switching valve body 253 rotatably fitted in the injector guide. Each fuel injection valve 110 is connected to an end portion of the corresponding one of the cylindrical injector guides 251 extending through the rails 201, 203, and is supplied with fuel from a fuel passage 257 extending within the injector guide 251 in the direction of an axis thereof.

Each valve body 253 has a cylindrical shape, and is rotatably fitted within a bore formed in the injector guide 251. In FIG. 2, 260 represents a link for simultaneously turning the valve bodies 253 in the injector guides 251 by equal angles. The link 260 is connected to each switching valve body 253 via a crank 261. By moving the link 260 in directions along the axis thereof (directions indicated by arrows in FIG. 2) through the use of a suitable actuator, the valve bodies 253 of the injector guides are simultaneously turned by equal angles.

In this embodiment, each valve body 253 has a bore 270 that is open to the fuel passage 257 within the corresponding injector guide 251.

FIGS. 3(A), 3(B) show sections along line A—A (high-RON fuel rail 203) and line B—B (low-RON fuel rail 201) in FIG. 2.

As shown in FIGS. 3(A), 3(B), radial-direction fuel inlet passages 201a, 203a that are open to the low-RON fuel rail 201 and the high-RON fuel rail 203, respectively, and that connect the bore in the injector guide 251 to the corresponding rails extend through the wall surface of the injector guide 251. The passages 201a and 203a extend parallel to each other and in the direction of the rail axis.

The valve body 253 has, at heights facing the passages 201a, 203a, radial-direction passages 201b, 203b that likewise connect the outer periphery of the valve body 253 and the bore 270 in the valve body. However, the passages 201b and 203b form an angle of 90 degrees with respect to each other. By arranging the passages 201b and 203b of the valve body 253 at an angle of 90 degrees with respect to each other in this manner, it becomes possible to exclusively connect an arbitrary one of the low-RON fuel rail 201 and the high-RON fuel rail 203 to the fuel injection valve 110.

That is, if the valve body 253 is turned, by using the link 260, to a position where the fuel passages 203b of the valve body communicate to the fuel passages 203a of the injector guide 251 as indicated in FIGS. 3(A), 3(B), the fuel passages 201b of the valve body are disconnected from the fuel passages 201a of the injector guide 251.

Therefore, at the rotational position of the valve body 253 indicated in FIGS. 3(A), 3(B), the high-RON fuel in the rail 203 flows into the bore 270 of the valve body 253 via the fuel passages 203a of the injector guide 251 and the fuel passages 203b of the valve body. The high-RON fuel is then supplied into the fuel injection valve 110 via the fuel passage 257 of the injector guide 251. However, since the fuel passages 201a and 201b are disconnected from each other in this position, the low-RON fuel in the low-RON fuel rail 201 is not supplied to the fuel injection valve 110. Therefore, at the valve body position indicated by FIGS. 3(A), 3(B), only the high-RON fuel is supplied to the engine.

FIGS. 3(C), 3(D) indicate a state of the valve body 253 when it is turned by 90 degrees from the position indicated in FIGS. 3(A), 3(B).

In this case, the passages 201a and 201b communicate with each other and the communication between the passages 203a and 203b is blocked, opposite to the condition indicated in FIGS. 3(A), 3(B). Therefore, the fuel injection valve 110 is supplied only with the low-RON fuel from the low-RON fuel rail 201.

FIGS. 4(A) through 4(C) are sectional views of another embodiment of the fuel switching mechanism, similar to the sectional views of FIGS. 3(A) through 3(D). Although FIGS. 3(A) through 3(D) show a construction in which one of the high-RON fuel and the low-RON fuel is supplied to the engine exclusively. In a construction shown in FIGS. 4(A) through 4(C), it is possible to supply only one of the high-RON fuel and the low-RON fuel to the engine as in the construction of FIGS. 3(A) through 3(D), and it is also possible to supply both the high-RON fuel and the low-RON fuel at a predetermined mixture ratio to the engine.

That is, in the embodiment of FIGS. 4(A) through 4(C), in addition to fuel passages 201b, 203b forming an angle of 90 degrees with each other as in the case of FIGS. 3(A) through 3(D), the valve body 253 is provided with different radial-direction fuel passages 201c and 203c that are open to the rails 201 and 203. In this case, the passages 201c and 203c are provided in the same phase, for example, at an angle of 45 degrees with respect to the passages 201b, 203c, respectively. Therefore, by turning the valve body 253 so as to connect the fuel passages 201c and 203c for the rails to the fuel passages 201a and 203a of the injector guide in communication, the fuels from both rails via the fuel passages 201c and 203c can be supplied to the fuel injection valves. That is, in this case, the fuel passage 257 of each injector guide 251 functions as a mixed fuel supply passage for supplying the engine with a mixture of the high-RON fuel and the low-RON fuel, that is, a fuel having an intermediate octane value (intermediate-RON value).

FIG. 4(A) shows a case where only the high-RON fuel is supplied to the engine. FIG. 4(C) shows a case where only the low-RON fuel is supplied to the engine. FIG. 4(B) shows a case where the high-RON fuel and the low-RON fuel are mixed and supplied to the engine. In FIG. 4(B), the mixture ratio of the high-RON fuel and the low-RON fuel can be adjusted by changing the diameters of the fuel passages 201c, 203c.

Next a control of the flow of fuel will be described in a case where only one of the high-RON fuel and the low-RON fuel is used to operate the engine in the embodiment of FIG. 1.

As can be understood from FIG. 1, the high-RON fuel and the low-RON fuel are always simultaneously produced during operation of the separator device 10. Therefore, in the case where the engine is operated by using only one of the high-RON fuel and the low-RON fuel, the other fuel simultaneously produced must be discharged from the separator device 10 in some manner; otherwise, the operation of the separator device 10 cannot continue. In this case, the operation of the separator device 10 can be continued if one of the separated fuel that is not supplied to the engine is refluxed to the material fuel tank 3. However, if the separated fuel that is not used is always returned to the material fuel tank 3, about a half of the energy needed for the separation is uselessly consumed. If a portion of the separation energy is consumed uselessly, the fuel economy of the entire engine becomes degraded, in some cases.

Therefore, in the embodiment of FIG. 1, a fuel supply passage of one of the separated fuel extending from the separator device 10 to the fuel injection valves (the high-RON fuel supply passage in FIG. 1) is provided with a storage tank) that is capable of temporarily storing the separated fuel.

That is, in the embodiment of FIG. 1, the high-octane fuel supply passage 219 is provided with the subsidiary tank 5, so that the high-RON fuel produced by the separator device 10 can be temporarily stored. The high-RON fuel that is temporarily stored in the subsidiary tank 5 after being produced is delivered from the subsidiary tank 5 to the high-pressure supply pump (fuel injection pump) 123 by the low-pressure feed pump 125, and is pressurized to a predetermined pressure by the high-pressure supply pump 123, and is then pumped to the high-RON fuel rail 203 in the dual delivery pipe 20 when the fuel is to be used.

On the other hand, the low-RON fuel produced by the separator device 10 in this embodiment is supplied directly to the low-RON fuel rail 201 of the dual delivery pipe 20 via the low-RON fuel supply passage 213.

As description will be given with regard to a case where only the low-RON fuel is used for the engine, for example, at the time of startup of the engine, cold-operation, etc.

In this case, the low-RON fuel produced by the separator device 10 is pumped from the low-RON fuel supply passage 213 directly to the low-RON fuel rail 201 of the dual delivery pipe 20, and is supplied from the fuel injection valves 110 into the engine. On the other hand, the high-RON fuel produced simultaneously with the low-RON fuel is stored in the subsidiary tank 5. Therefore, the operation using the low-RON fuel can be conducted without refluxing the high-RON fuel to the material fuel tank. Hence, useless consumption of energy needed to separate the high-RON fuel (reflux of the high-RON fuel to the material fuel) is prevented.

In a case where the operation of the engine using only the low-RON fuel is conducted for a long time, it is conceivable that the amount of the high-RON fuel produced increases to or above the capacity of the subsidiary tank 5 even in the embodiment. In the embodiment, the subsidiary tank 5 is provided with the overflow piping 225 connected to the material fuel tank 3. Therefore, if the amount of high-RON fuel stored in the subsidiary tank 5 increases and the liquid surface level reaches an upper limit value, an excess amount of the high-RON fuel flows back to the material fuel tank 3 via the overflow piping 225. Hence, the liquid surface level in the subsidiary tank 5 does not rise above the upper limit value. As a result, extended operation using only the low-RON fuel becomes possible.

In this case, the energy needed to separate the high-RON fuel that overflows from the subsidiary tank 5 and returns to the material fuel tank 3 is uselessly consumed. However, since the capacity of the subsidiary tank 5 is set relatively large, the frequency of occurrence of overflow at the time of ordinary engine startup or ordinary cold operation thereof is relatively low.

Furthermore, in this embodiment, the subsidiary tank 5 stores the high-RON fuel. Therefore, for example, in a case where the engine is operated by using only the high-RON fuel, the engine can be operated by using the high-RON fuel stored in the subsidiary tank 5 while keeping the separator device 10 stopped. In this case, the high-RON fuel is delivered to the high-pressure supply pump 123 by the low-pressure feed pump 125. After being pressurized by the pump 123, the high-RON fuel is supplied to the high-RON fuel rail 203 of the dual delivery pipe 20 via the high-RON fuel supply passage 219. Therefore, since the separator device 10 can be stopped during operation of the engine based on the high-RON fuel, the consumption of energy needed for the separation during the high-RON fuel operation can be reduced.

However, if the engine is operated using the high-RON fuel stored in the subsidiary tank 5 as described above, continuation of engine operation based on the high-RON fuel may cause an insufficient amount of the high-RON fuel in the subsidiary tank 5 in some cases. In this embodiment, the liquid surface level of the high-RON fuel in the subsidiary tank 5 is monitored by the level sensor 43. When the liquid surface falls to a predetermined lower limit value, operation of the separator device 10 is started to restart production of the high-RON fuel. In this case, the low-RON fuel is simultaneously produced. In this embodiment, the supply passage of the low-RON fuel is not provided with a tank corresponding to the subsidiary tank 5.

Therefore, if the separator device 10 is operated during the high-RON fuel operation, the supply pressure of the high-pressure supply pump 115 is raised above the supply pressure used during stop page of the separator device 10. As a result, the pressure of the low-RON fuel supplied to the low-RON fuel rail 201 also rises.

As shown in FIG. 1, in this embodiment, both fuel rails 201, 203 of the dual delivery pipe 20 are provided with relief valves 227, 229 for protecting the fuel rails, respectively. The relief valves 227, 229 are connected to a common return piping 223. When the fuel pressure in the relief valve 227, 229 exceeds a predetermined value, the relief valve 227, 229 is opened, so that fuel is refluxed from the rail to the material fuel tank 3 via the return piping 223.

If the discharge pressure of the material fuel high-pressure supply pump 115 is raised as described above for operation of the separator device 10 during the engine operation based on the high-RON fuel, the pressure of the low-RON fuel also rises, so that the internal pressure of the low-RON fuel rail 201 rises. As a result, the relief valve 227 of the low-RON fuel rail 201 is opened, so that fuel in the low-RON fuel rail 201 is refluxed to the material fuel tank 3 via the return piping 223. Therefore, even when only the high-RON fuel is used, the separator device 10 can be operated.

This embodiment is provided with the subsidiary tank 5 for only the high-RON fuel. Therefore, the duration of operation based on the high-RON fuel becomes long, it becomes necessary to reflux the low-RON fuel separated by the separator device 10 to the material fuel tank 3. If in order to prevent this, a construction as shown in FIG. 5, for example, is adopted in which a subsidiary tank 7 for the low-RON fuel is provided in addition to the subsidiary tank 5 for the high-RON fuel, so that the low-RON fuel produced during operation based on the high-RON fuel will be temporarily stored in the subsidiary tank 7, and the energy needed for the separation is effectively used.

Figure 5:
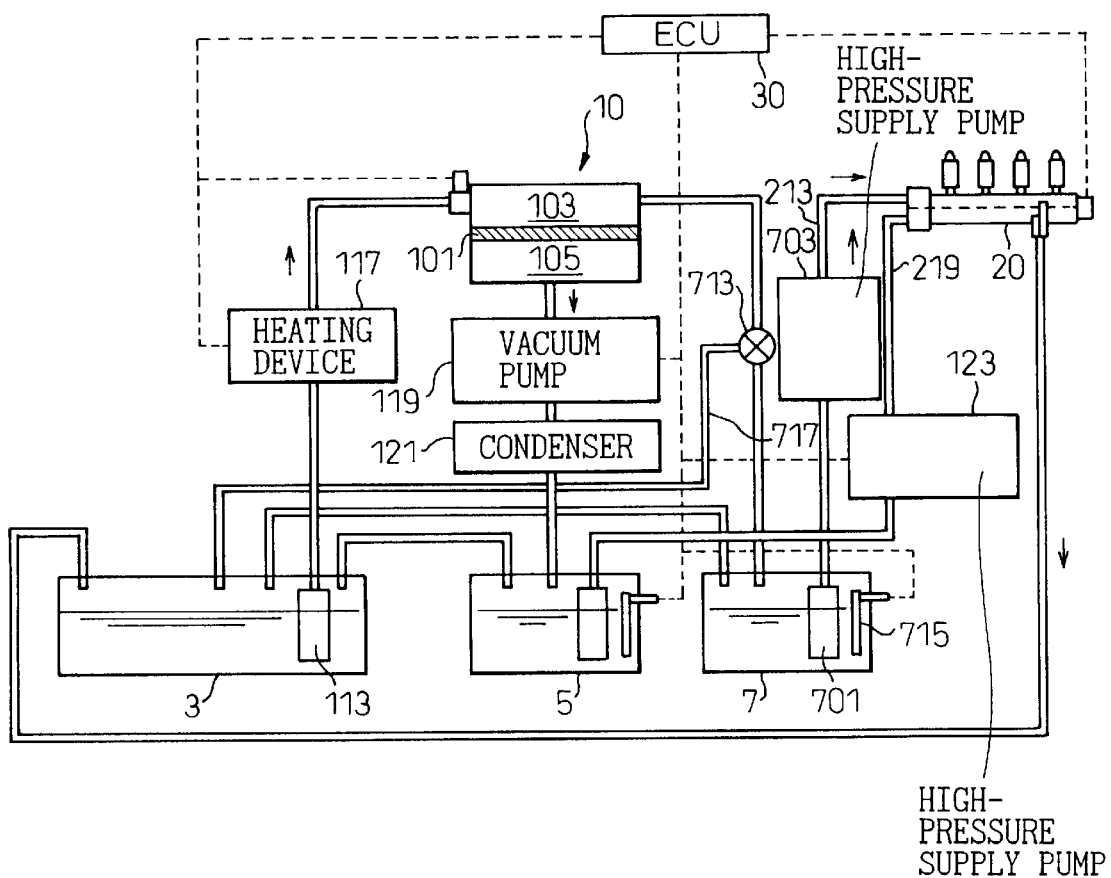
FIG. 5 is a diagram schematically illustrating a construction of an embodiment of the fuel supply apparatus of the invention different from the one shown in FIG. 1.

In FIG. 5, the low-RON fuel subsidiary tank 7, similar to the high-RON fuel subsidiary tank 5, has a low-pressure feed pump 701, and a high-pressure supply pump 703 that pressurizes the low-RON fuel supplied from the tank 7 via the pump 701 and pumps the fuel to the low-RON fuel rail 201 of the dual delivery pipe 20. The tank 7 is further provided with an overflow piping 709 for refluxing the low-RON fuel from the tank to the material fuel tank 3 in order to keep the liquid surface of the low-RON fuel in the tank 7 at or below an upper limit value.

Instead of the overflow piping 709, or in addition to the piping 709, a supply passage 711 for supplying the low-RON fuel from the separator device 10 to the subsidiary tank 7 may be provided with a switching valve 713. The switching valve 713 is switched to reflux the low-RON fuel supplied from the separator device 10 to the material fuel tank 3 via a return piping 717, when the liquid surface level detected by a level sensor 715 provided for the subsidiary tank 7 exceeds a predetermined value.

Thus, the provision of the overflow piping 709 (and/or the switching valve 713 and the return piping 717) and the level sensor 715 on the low-RON fuel subsidiary tank 7 makes it possible to operate the separator device 10 so as to produce the low-RON fuel and store the simultaneously produced high-RON fuel into the high-RON fuel subsidiary tank 5 when the liquid surface level of the low-RON fuel in the subsidiary tank 7 falls after a lengthy operation of the engine using only the low-RON fuel. Therefore, the consumption of energy needed for the separation can be further reduced.

In this embodiment, the subsidiary tank 7 is separately provided with a high-pressure supply pump (fuel injection pump). Therefore, the material fuel is supplied to the separator device 10 only via the low-pressure feed pump 113 and the material fuel supply pump 115 as shown in FIG. 1 is not provided.

Next, control of the separator device 10 will be described.

In this embodiment, the high-RON fuel and the low-RON fuel are produced from the material fuel. The amount and the property (particularly, octane value) of the high-RON fuel separated by the separation membrane 101 largely varies in accordance with the conditions of operation of the separation membrane, that is, the temperature of the material fuel in contact with the separation membrane, the amount of flow of the material fuel, the temperature, and the pressure.

For example, even if the supply amount of flow of the material fuel increases while the other conditions remain unchanged, substantially no change occurs in the permeation speed of the aromatic component and the like that permeate through the separation membrane 101, so that substantially no change occurs in the amount of the high-RON fuel produced. However, if the supply amount of flow of the material fuel increases, the amount of the low-RON fuel produced correspondingly increases but the permeation speed of the aromatic component that permeates through the separation membrane 101 hardly changes. Therefore, the amount of aromatic component removed from the material fuel per unit amount of the material fuel flow decreases. Hence, the amount of fuel produced as the low-RON fuel increases, but the octane value of the low-RON fuel correspondingly increases.

Furthermore, if the supply pressure of the material fuel is increased, the amount of components that permeate through the separation membrane 101 increases and therefore the amount of the high-RON fuel produced increases provided that the other conditions remain unchanged. In this case, however, since the selective permeability of aromatic component decreases, components other than the aromatic component tend to permeate to the high-RON fuel side. Therefore, the octane value of the fuel separated as a high-RON fuel decreases although the amount of the high-RON fuel produced increases.

Furthermore, if the negative pressure on the low pressure-side section 105 side is increased (the absolute pressure is decreased), the permeation speed of the aromatic component increases and the amount of the high-RON fuel produced increases provided that the other conditions remain unchanged. In this case, the aromatic component concentration in the high-RON fuel obtained also increases. Therefore, both amount and octane value of the high-RON fuel produced increase.

Likewise, if the material fuel temperature is raised, the temperature of the separation membrane also rises, so that the permeation speed of the aromatic component increases if the other conditions remain unchanged. Thus, both the amount of the high-RON fuel produced and the octane value thereof increase.

As stated above, the amount of production of the high-RON fuel obtained by the separator device 10 and the octane value thereof change in accordance with the temperature, the pressure and the supply amount of flow of the material fuel, and the negative pressure on the low pressure side. Since the low-RON fuel is formed by a portion remaining after removable of the high-RON fuel from the material fuel in the separator device 10 of the embodiment, a change in the aforementioned operation conditions changes the amount and octane value of the low-RON fuel produced and the amount and octane value of the high-RON fuel produced in opposite directions.

In this embodiment, the ECU 30 detects the amount and octane value of the high-RON fuel or the low-RON fuel produced by the separator device 10, and controls the amount and octane value of the high-RON fuel or the low-RON fuel produced to desired values by controlling the aforementioned conditions of operation of the separator device. Since the material fuel temperature and the separation membrane temperature have a correlation, the separation membrane temperature, as a condition of operation of the separation membrane, is controlled by adjusting the material fuel temperature in this embodiment. However, it is also possible to provide a temperature sensor capable of directly detecting the separation membrane temperature and a heating device for directly heating the separation membrane, such as an electric heater or the like, and to thereby directly control the separation membrane temperature.

For example, if, in the embodiment of FIG. 1, the operation using the high-RON fuel continues and a low liquid surface level in the subsidiary tank 5 is detected, the ECU 30 raises the discharge pressure of the high-pressure supply pump 115 of the material fuel, and raises the temperature of the heating device 117, so as to raise the temperature and pressure of the material fuel supplied to the separator device 10. Simultaneously, the ECU 30 increases the amount of flow of the vacuum pump 119 to increase the negative pressure (decrease the absolute pressure) in the low-pressure section 105 of the separator device 10. Therefore, the amount of the high-RON fuel produced can be increased without a decrease in the octane value of the high-RON fuel.

According to experiment, it was found that the magnitude of effects of the aforementioned factors on the change in the amount of high-RON fuel produced by the membrane is larger in the order of the material fuel supply pressure, the pressure in the low-pressure section, the material fuel temperature (or the membrane temperature). Therefore, when these conditions are changed in order to increase the amount of the high-RON fuel, the material fuel supply pressure is first increased and, next, the pressure in the low-pressure section is decreased, then the material fuel temperature is increased. Further, if the area of the membrane contacting the material fuel can be changed, it is also effective to increase the contact area of the membrane in order to increase the amount of high-RON fuel.

Further, it will be understood that the aforementioned factors must be changed in the reverse direction in order to increase the amount of low-RON fuel produced by the membrane. Therefore, for example, in the embodiment in FIG. 5, if the level of the low-RON fuel in the tank 715 detected by the level sensor 715 becomes low, the material fuel supply pressure is lowered and the pressure in the low-pressure section is increased and the temperature of the material fuel is lowered in order to increase the amount of low-RON fuel produced by the membrane.

In addition to the control of the amount of the separated fuels produced by the separator device 10 based on the amount of separated fuel in the storage tanks 5 and 701, the ECU 30 in this embodiment controls the octane value of the separated fuels. Namely, the ECU 30 detects the octane value of the separated fuel in use during operation of the internal combustion engine 1 by a method described later, and controls the aforementioned conditions of operation of the separator device 10 so that the octane value of the high-RON fuel or the low-RON fuel becomes equal to a desired value.

For example, if the octane value of the high-RON fuel is lower than a desired value, the ECU 30 increases the negative pressure in the low pressure-side section 105 by increasing the amount of flow through the vacuum pump 119, or raises the temperature of the material fuel by raising the temperature of the heating device 117. As a result, the permeation speed of the aromatic component that permeates through the separation membrane 101 increases, so that the proportion of the aromatic component in the high-RON fuel increases. Therefore, the octane value of the high-RON fuel increases. Furthermore, the octane value of the high-RON fuel and the octane value of the low-RON fuel undergo opposite changes. Therefore, if the octane value of the low-RON fuel is higher than a desired value, the octane value of the low-RON fuel can be adjusted to the desired value by performing a similar operation.

As stated above, the amount of a separated fuel produced or the property (octane value) thereof can be controlled to a desired value by detecting the amount and property of the separated fuel produced and accordingly controlling the conditions of operation of the separator device. Therefore, a separated fuel can be provided in a stable amount and with a stable property.

Next, an in-use fuel octane value detecting operation executed by the ECU 30 will be described. In this embodiment, the ECU 30 indirectly detects the octane value of a fuel in use based on the conditions of operation, such as the engine load, the engine revolution speed, the air-fuel ratio, etc., and the ignition timing when knocking occurs.

For example, during an ordinary operation, the engine ignition timing is set toward an advanced side as the engine load or the engine revolution speed increases or as the air-fuel ratio of mixture increases (mixture is fuel-leaner). However, a change in the octane value of a fuel in use changes the ignition timing that causes knocking even if other conditions of operation remain unchanged. That is, the ignition timing that causes knocking shifts toward the advanced side with an increase in the octane value of fuel, and shifts toward the retarded side with a decrease in the octane value thereof.

In this embodiment, an experiment was carried out beforehand in which the engine was operated using fuels having different octane values in various combinations of the engine load, the engine revolution speed and the air-fuel ratio, and most retarded-side ignition timings that do not cause knocking (knocking limit-point ignition timing) are measured in the operation of the engine on the various fuel octane values. If the operation conditions remain unchanged, the knocking limit-point ignition timing exhibits a one-to-one correspondence to the fuel octane value. Therefore, if the operation conditions and the knocking limit-point ignition timing are known, the octane value of a fuel in use can be determined. In this embodiment, the fuel octane value is arranged in the form of a numerical table using the knocking limit-point ignition timing, the engine load, the engine revolution speed, the air-fuel ratio, etc., as parameters. This numerical table is stored in the ROM of the ECU 30.

If knocking of the engine is detected by the knocking sensor 35 during operation of the engine based on either the high-RON fuel or the low-RON fuel, the ECU 30 executes a knocking suppressing operation by retarding the ignition timing by a constant amount at a time. Then, based on the ignition timing when the knocking is suppressed (i.e., the knocking limit-point ignition timing) and the engine operation conditions at that time (the amount of fuel supplied, the revolution speed, the exhaust air-fuel ratio detected by the exhaust air-fuel ratio sensor 33, etc.), the ECU 30 looks up the aforementioned fuel octane value numerical table, and determines the octane value of the fuel in use.

Although the octane value detecting operation is performed in this embodiment when knocking occurs during operation of the engine, the octane value of a fuel in use can be determined through the use of the aforementioned numerical table by artificially causing knocking by advancing the ignition timing during an operation during which no knocking is present, and by detecting the ignition timing that initiates occurrence of knocking (i.e., the knocking limit-point ignition timing).

In this embodiment, since the octane value of a fuel in use is detected during operation of the engine by one of the aforementioned methods, the conditions of operation of the separator device 10 can be adjusted so that the octane value detected by one of the aforementioned methods becomes equal to a desired octane value. Therefore, it becomes possible to produce separated fuels (the high-RON fuel and the low-RON fuel) having stable octane values via the separator device 10.

Next, problems at the time of starting the separator device 10 will be described.

As described above, the low-RON fuel is good in ignition and combustion. Therefore, it is preferable that the low-RON fuel be used to operate the engine, for example, at the time of startup of the engine or the time of cold operation.

However, in a fuel supply apparatus that does not have a subsidiary tank on the low-RON fuel supply passage as in the embodiment of FIG. 1, it is necessary to start the operation of the separator device 10 simultaneously with the startup of the engine in order to produce the low-RON fuel and supply it to the engine.

However, the separator device 10 cannot produce a stable low-RON fuel unless the conditions of operation, such as the amount of flow, the pressure, the temperature, etc, are adjusted to predetermined values. Therefore, if the separator device 10 is actuated simultaneously with startup of the engine, there occurs a problem of failing to supply the engine with a low-RON fuel having a sufficiently low octane value at the time of startup of the engine.

If the low-RON fuel subsidiary tank 7 is provided as in the embodiment of FIG. 5, it becomes possible to start the engine using the low-RON fuel stored beforehand in the subsidiary tank 7, and therefore, the aforementioned problem at the time of startup does not occur. However, separate provision of the subsidiary tank 7, the high-pressure supply pump 703 for the low-RON fuel, etc., gives rise to problems of a complicated apparatus and an increased apparatus cost.

Figure 6:
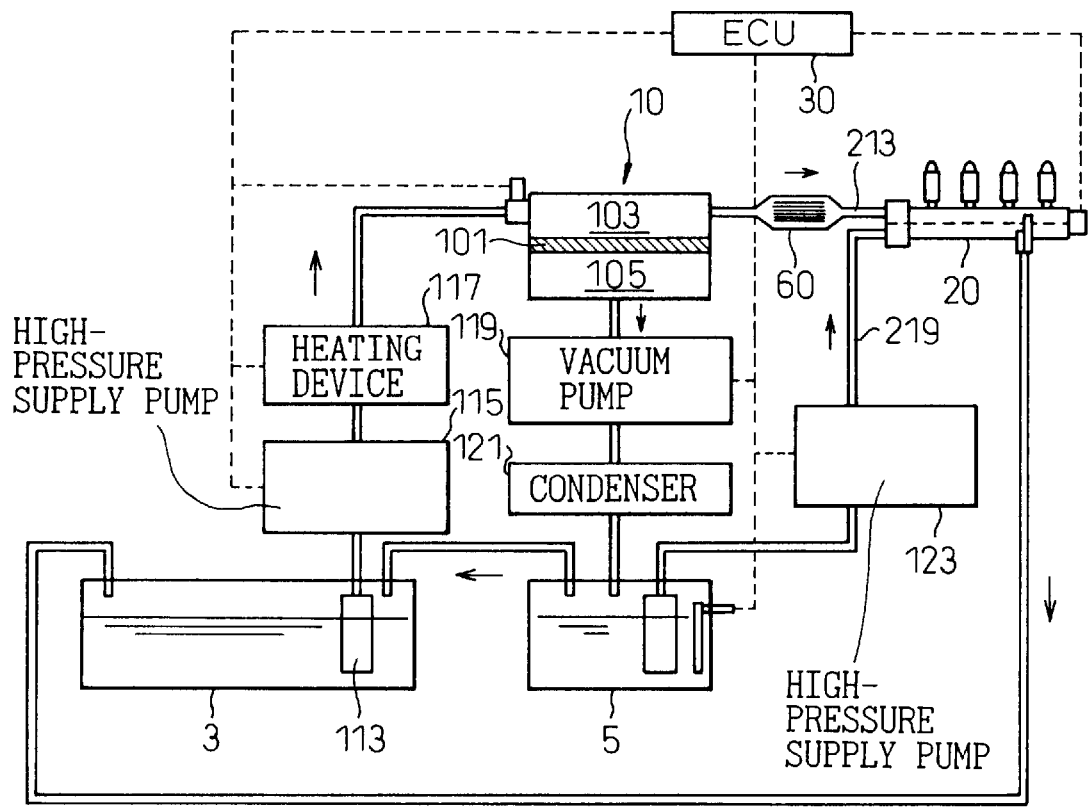
FIG. 6 is a diagram schematically illustrating a construction of an embodiment of the fuel supply apparatus of the invention different from the ones shown in FIGS. 1 and 5.
Figure 7:
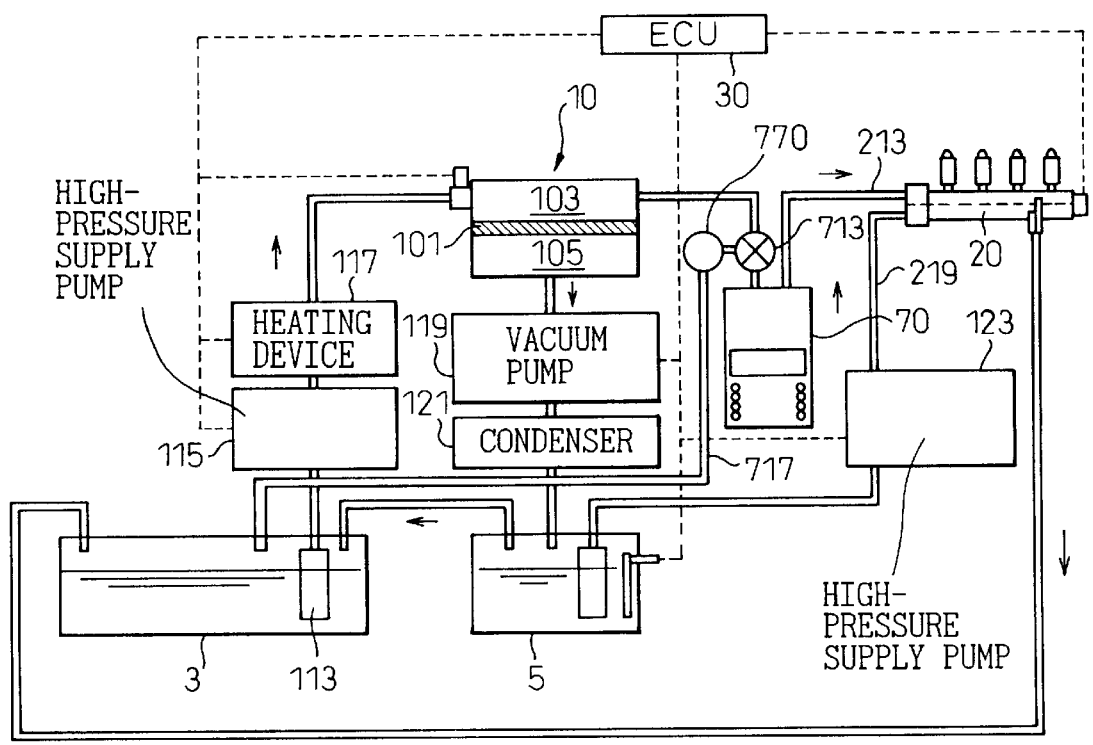
FIG. 7 is a diagram schematically illustrating a construction of an embodiment of the fuel supply apparatus of the invention different from the ones shown in FIGS. 1, 5 and 6.

In embodiments in FIGS. 6 and 7, the aforementioned startup-time problem is solved without providing a subsidiary tank and a high-pressure supply pump for the low-RON fuel.

FIG. 6 shows an example in which a portion of the low-RON fuel supply passage 213 is provided with a relatively large capacity portion (reservoir) 60. In FIG. 6, the same reference numerals as used in FIG. 1 represent comparable elements. The reservoir 60 in FIG. 6 has a simple construction in which the low-RON fuel supply passage 213 is merely provided with a large-diameter portion. Unlike the subsidiary tank, the reservoir 60 is always filled with the low-RON fuel during operation of the separator device 10 so that no free liquid surface of the fuel is formed.

When an operation using the low-RON fuel is performed during operation of the engine, a high-pressure low-RON fuel is supplied to the engine via the reservoir 60. When the separator device 10 is stopped in this condition, the flow in the low-RON fuel supply passage 213 stops, and the reservoir 60 is held in a state in which the reservoir 60 is filled with the low-RON fuel. After the engine stops, the reservoir 60 remains in a state in which the reservoir 60 stores the low-RON fuel. In this embodiment, the high-pressure supply pump 115, the heating device 117, the vacuum pump 119, etc., are started to start operation of the separator device 11 simultaneously with startup of the engine.

However, it takes some time before the operation conditions in the separator device 10 come to allow production of a low-RON fuel of a stable octane value. Therefore, immediately after the separator device is actuated, the low-RON fuel supply piping is supplied merely with a fuel having substantially the same composition as that of the material fuel.

Even in this case, due to the reservoir 60 provided on the supply passage 213 in this embodiment, supply of a fuel from the separator device 10 to the fuel supply passage 213 expels the low-RON fuel stored in the reservoir 60, so that the low-RON fuel is supplied to the engine. Therefore, even at the time of startup of the engine during which suitable operation conditions of the separator device 10 are not achieved yet, the engine can be started through the use of the low-RON fuel stored in the reservoir 60.

FIG. 7 shows a case where an accumulator 70 is provided instead of the subsidiary tank 7 shown in FIG. 5. In FIG. 7, the same reference numerals as in FIG. 5 represent comparable elements. The accumulator 70 in FIG. 7 is a type generally used in the art which utilizes gas pressure or spring force in order to maintain liquid in the accumulator in a pressurized state. Since the embodiment employs an accumulator capable of retaining a pressurized state of the low-RON fuel therein, it is possible to supply the low-RON fuel to the engine at the time of startup of the engine without providing a low-RON fuel high-pressure supply pump 703.

In the example of FIG. 7, the switching valve 713 is held at a position where the low-RON fuel from the separator device 10 is supplied to the accumulator 70 when the separator device 10 is operating in a state that a low-RON fuel having a stable composition is produced by the separator device 10. Therefore, the high-pressure low-RON fuel supplied from the separator device 10 is stored in a pressurized state within the accumulator 70. At the time of stopping of the engine, the switching valve 713 is switched to a position where it connects the separator device to the return piping 717. Therefore, the low-RON fuel is held in a pressurized state within the accumulator 70 even while the engine is stopped.

When the engine is next started, the separator device 10 is actuated while the switching valve 713 is held at the position where it connects the return piping 717 and the separator device 10. Therefore, an initial-period fuel supplied from the separator device 10 is refluxed from the switching valve 713 to the material fuel tank 3 via the return piping 717. The return piping 717 is provided with a relief valve 770 that is opened at or above a certain pressure to reflux fuel from the switching valve 713 to the material fuel tank 3, in order to maintain the pressure of the high-pressure section 103 of the separator device 10.

That is, during a period of startup of the engine in which the separator device 10 is not able to stably produce a low-RON fuel, the low-RON fuel produced by the separator device is refluxed to the material fuel tank 3, and the low-RON fuel stored in a pressurized state within the accumulator 70 is supplied to the engine instead. Therefore, the low-RON fuel can be supplied to the engine simultaneously with startup of the engine.

Among the operation conditions of the separator device 10 (amount of flow, pressure, temperature), the conditions of pressure and amount of flow can be raised to required values in a relatively short time following start of operation of the separator device 10. However, a relatively long time is required to raise the temperature of the material fuel or, more precisely, the temperature of a portion of contact between the separation membrane 101 and the material fuel in the high-pressure section 103. Furthermore, during operation of the separator device 10, fuel on the low pressure-side section 105-side of the separation membrane continuously evaporates. Therefore, during operation of the separator device 10, latent heat flows out of the separator device 10 together with the high-RON fuel vapor.

Hence, in order to maintain a high temperature within the separator device 10, it is necessary to prevent dissipation of heat from the separator device 10 into the atmosphere and to provide a heat corresponding to the heat of vaporization of the fuel. Therefore, if heat dissipation to the atmosphere is prevented by providing a heat insulator 100a (FIG. 1) around the housing 100 of the separator device 10 and the separator device 10 is thermally insulated and heated by providing a jacket or piping between the heat insulator and the housing 100 and causing high-temperature cooling water of the engine (or exhaust gas of the engine) to flow through the jacket or piping, the energy needed for the heating of the separator device can be reduced.

Furthermore, in order to heat the material fuel in the separator device 10 in a short time even at a startup of the engine when high-temperature cooling water or high-temperature exhaust from the engine cannot be obtained, it is preferable that a sheet-like or a coil-like electric heater be provided within the separator device. Therefore, the temperature of contact between the material fuel and the separation membrane can be raised in a short time following actuation of the separator device, and the time between the start of the separator device and the stable production of a separated fuel can be reduced.

Next, the selective use of the high-RON fuel and the low-RON fuel in accordance with the engine operation conditions will be described.

As stated above, a fuel having a decreased octane value is better in ignition and combustion characteristics and, therefore, decreases the amount of unburned hydrocarbons in exhaust from the engine, thereby improving the exhaust property. However, a fuel having a lower octane value is more likely to ignite by itself in the combustion chamber, and therefore tends to cause knocking if the engine is operated at an optimum ignition timing that maximizes the output of the engine. Therefore, if a low-octane value fuel is used, the ignition timing must be retarded from an optimum value in order to prevent knocking, thus giving rise to a problem of failing to provide a sufficient output of the engine. Hence, it is desirable that the octane value of a fuel be as low as possible within a range that causes no knocking.

Still further, since a low-RON fuel is good in ignition and combustion characteristics, supply of a low-RON fuel to the engine at the time of startup of the engine or cold-operation of the engine will improve combustion in the engine.

A high-RON fuel, since it is unlikely to cause knocking, allows advancement of the ignition timing to an optimum value without causing knocking even during a high-output operation of the engine. Therefore, during a high-output operation of the engine, it is possible to increase the engine output by using a high-RON fuel.

Figure 4:
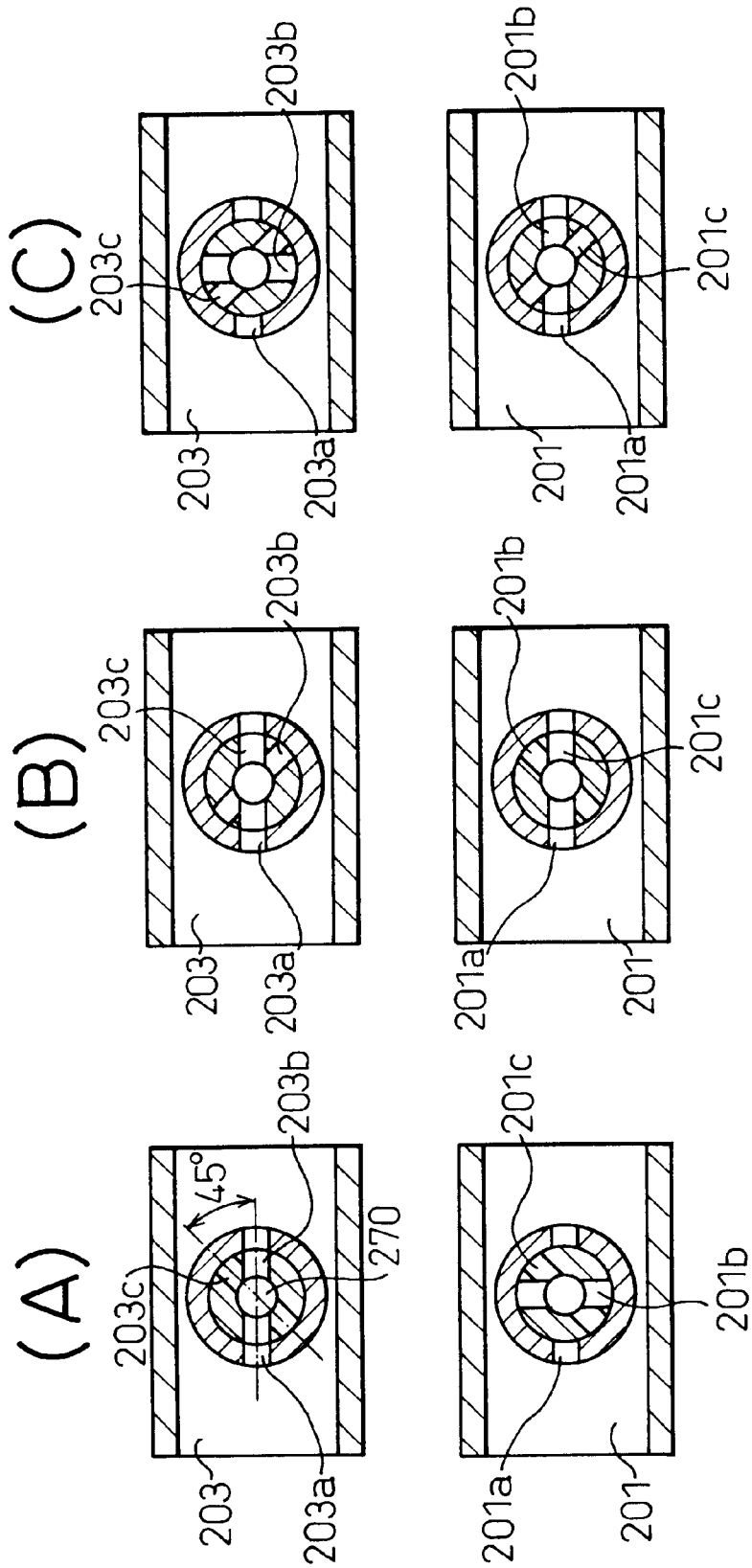
FIGS. 4(A) through 4(C) are section views similar to FIGS. 3(A) through 3(D), illustrating another embodiment of the fuel switching mechanism.

It is also preferable that the octane value of a fuel be as low as possible within a range that causes no knocking. Therefore, if an intermediate-octane value fuel having an octane value between the octane values of the high-RON fuel and the low-RON fuel is used during an intermediate-output operation of the engine, the state of combustion in the engine can be improved while knocking is suppressed. The intermediate-octane value fuel having various octane value can be produced by mixing the high-RON fuel and the low-RON fuel through the use of a fuel switching mechanism as shown in FIG. 4 or, as explained later in FIGS. 8 and 9, the octane value of the fuel supplied to the engine cylinders can be adjusted by supplying the high-RON fuel and the low-RON fuel to the engine cylinder separately. Thus, an improved output and an improved exhaust property can be easily achieved by using intermediate-octane value fuel in this embodiment.

Next will be described the selective use of the high-RON fuel and the low-RON fuel in a case where the invention is applied to an engine capable of changing between stratified charge combustion and homogeneous mixture combustion for operation.

In homogeneous mixture combustion, a uniform mixture of fuel and air is formed in an engine combustion chamber, and combustion is performed by igniting the mixture through the use of a spark plug. However, in the homogeneous mixture combustion, the air-fuel ratio of the entire mixture in the combustion chamber needs to be within a combustible range. Therefore, the air-fuel ratio of mixture cannot be raised (shifted to a fuel-lean side), thus giving rise to a problem of failing to sufficiently improve the fuel economy or the exhaust property (e.g., $NO_x$ concentration).

On the other hand, in stratified charge combustion, a mixture of a combustibles air-fuel ratio is stratified near a spark plug of a cylinder by injecting fuel into the cylinder during a later period of the compression stroke of the cylinder. By stratifying a combustible air-fuel ratio mixture around the spark plug in this fashion, it becomes possible to perform stable combustion while keeping the air-fuel ratio in terms of the entire cylinder to a considerably high (fuel-lean) level in comparison with the air-fuel ratio during the homogeneous mixture combustion.

However, in stratified charge combustion, the air-fuel ratio of mixture in the combustion chamber becomes higher (leaner) with positional shifts from a combustible air-fuel ratio mixture layer formed around the plug toward a peripheral portion of the combustion chamber. Therefore, if flame caused by ignition of the combustible air-fuel ratio mixture around the plug does not smoothly propagate to a surrounding lean mixture layer, combustion degradation in the surrounding lean mixture layer occurs, and this results in a reduced engine output or an increased unburned hydrocarbon content in exhaust, in some cases.

In this embodiment, the aforementioned problem is solved by using the low-RON fuel if stratified charge combustion is performed in the engine. Since the low-RON fuel is good in ignition characteristic as stated above, the flame caused in a combustible air-fuel ratio mixture layer during the stratified charge combustion very readily propagates to the surrounding lean mixture layer. Therefore, use of the low-RON fuel during the stratified charge combustion operation of the engine improves combustion, thereby increasing the engine output and improving the exhaust property. The low-RON fuel may be used for the entire operation region of the stratified charge combustion operation of the engine, or may also be used only for a specific region (particularly, a region where combustion is likely to deteriorate) of the stratified charge combustion operation.

On the other hand, the high-RON fuel may be used in a specific region of the stratified charge combustion operation. For example, when the engine load is relatively high and the engine speed is relatively low, the air-fuel ratio of the layer of the mixture becomes low due to an increase in the amount of fuel injected in the cylinder. In this case, since the air-fuel ratio of the mixture near the peripheral portion of the combustion chamber also becomes low, failure in the propagation of flame hardly occurs even if the engine is operated in the stratified charge combustion mode. Therefore, it is preferable to use high-RON fuel when the engine load is high and the engine speed is low even if the engine is operated in the stratified charge combustion mode.

Furthermore, when the engine is being operated in the homogeneous mixture combustion mode, increased engine output and improved fuel economy can be achieved by using the high-RON fuel except for the time of startup of the engine or cold-operation thereof. In this case, too, the high-RON fuel may be used in the entire engine operation region where the homogeneous mixture combustion is performed, or may also be used only for a specific region of the homogeneous mixture combustion operation (particularly, a region where knocking is likely to occur). Furthermore, in reality, it is desirable that the octane value of a fuel be changed in accordance with the engine load or the engine operation air-fuel ratio during the homogeneous mixture combustion operation as well. Therefore, for example, it is also possible to operate the engine by, for example, using the low-RON fuel during a low-load operation for the purpose of preventing degradation of combustion, and using the high-RON fuel during a high-output operation due to its capability of increasing the output, and using an intermediate-octane value fuel produced by mixing the high-RON fuel and the low-RON fuel in an intermediate output region.

In the embodiment, the octane value of the low-RON fuel can be reduced by adjusting the operation conditions of the separator device 10. Therefore, if a low-RON fuel of a sufficiently low octane value is used, fuel injected into the combustion chamber can ignite itself without using a spark plug. In self-ignition combustion, neither the air-fuel ratio in terms of the entire combustion chamber nor the propagation of flame to the lean mixture causes significant problems. Therefore, the self-ignition combustion can achieve better combustion at a still higher (leaner) air-fuel ratio than the stratified charge combustion.

Therefore, for example, if the self-ignition operation using the low-RON fuel is performed during an intermediate-to-low output operation and the spark ignition combustion of a homogeneous mixture using the high-RON fuel is performed during a high-output operation, it becomes possible to achieve increased output and improved exhaust property over the operation region of the engine.

As explained above, by operating an engine in the self-ignition combustion mode, improved combustion can be achieved at even higher air-fuel ratio than the stratified charge combustion. However, since combustion of air-fuel mixture occurs over entire volume of combustion chamber in a very short time, knocking occurs in the self-ignition combustion mode when the amount of fuel supplied to the combustion chamber increases (i.e., the air-fuel ratio of the mixture is lowered) in order to increase output of the engine. Therefore, only a relatively small amount of fuel can be supplied to the combustion chamber in the self-ignition combustion operation.

In order to increase the output of the engine while maintaining the improved combustion by self-ignition combustion, another type of self-ignition combustion, i.e., spark-initiated self-ignition combustion, can be used.

In spark-initiated self-ignition combustion, similarly to the stratified charge combustion, fuel is injected in such a manner that the injected fuel forms a layer of air-fuel mixture around a spark plug. Air-fuel ratio of the mixture in the combustion chamber is lowest at the center of the combustion chamber and increases (becomes leaner) towards the periphery of the combustion chamber. In other words, a spatial distribution of air-fuel ratio of the mixture exists.

When the mixture is ignited by the spark plug, a portion of the mixture which has a combustible air-fuel ratio (i.e., the portion near the spark plug) is ignited by the spark plug and burns. In the spark-initiated self-ignition combustion, flame does not propagate to the periphery of the combustion chamber because the air-fuel ratio of the mixture is higher at the periphery of the combustion chamber. However, when a portion of the mixture burns, the temperature and the pressure in the combustion chamber increases. This initiates self-ignition of the remaining (high air-fuel ratio) mixture in the combustion chamber. The self-ignition of the mixture occurs after a low air-fuel ratio mixture is ignited and burned by the spark plug. Further, since the self-ignition occurs in the region of the mixture where the air-fuel ratio is high, the self-ignition occurs gradually. Therefore, combustion of the mixture occurs in a relatively long period compared with the case where the self-ignition occurs in a homogeneous mixture, and knocking does not occur.

When the air-fuel ratio of the mixture is low (rich), self-ignition easily occurs. Therefore, in order to achieve the spark-initiated self-ignition combustion, it is preferable that the octane value of the fuel in the mixture around the spark plug is high so that self-ignition does not occur before the mixture is ignited by the spark plug. On the other hand, since the air-fuel ratio of the mixture is high at the peripheral portion of the combustion chamber, it is preferable that the octane value of the fuel in the mixture in the peripheral portion is low in order to facilitate the self-ignition.

Therefore, in order to satisfy both requirements, it is preferable to use a fuel having an octane value between the high-RON fuel and the low-RON fuel, i.e., use of an intermediate octane value fuel is preferable.

In the embodiment, the engine is operated in the self-ignition combustion mode at a low load operation of the engine using the low-RON fuel and is operated in the spark ignition combustion mode at a high load operation of the engine using the high-RON fuel. Further, at a medium load operation of the engine, the engine is operated in the spark-initiated self-ignition combustion mode using the intermediate octane value fuel produced by mixing the low-RON fuel and the high-RON fuel. Thus, in this embodiment, fuel economy and improved exhaust property can be achieved over entire operation region of the engine.

Further, when the operation mode of the engine is switched between three combustion modes, i.e., between the self-ignition combustion mode, the spark-initiated self-ignition combustion and the spark ignition combustion mode, the operation mode can be switched smoothly by changing the octane value of the fuel used in the spark-initiated self-ignition combustion mode in accordance with the engine load. In the spark-initiated self-ignition combustion mode, the engine can be operated on the low-RON fuel or the high-RON fuel as well as the intermediate-octane value fuel. Therefore, for example, if the high-RON fuel is used instead of the intermediate-octane value fuel when the engine is operated at a relatively high operation load during the spark-initiated self-ignition combustion mode operation, the switching from the spark-initiated self-ignition combustion mode operation to the spark ignition combustion operation mode can be performed smoothly without causing the abrupt change in the engine output. Similarly, if the low-RON fuel is used when the engine is operated at a relatively low operation load during the spark-initiated self-ignition combustion mode operation, the switching form the spark-initiated self-ignition combustion mode operation to the self-ignition combustion mode operation can be smoothly performed.

In the above operation, the engine operation mode is switched between three operation modes, i.e., between the self-ignition combustion mode, the spark-initiated self-ignition combustion and the spark ignition combustion mode. In other words, all three operation modes are employed in accordance with the engine load. However, the engine can be operated on only two operation mode, such as (a) the spark-initiated self-ignition combustion mode and the spark ignition combustion mode or (b) the self-ignition combustion mode and the spark-initiated self-ignition mode by selecting the octane value of the fuel.

When the engine operation mode is switched between the spark-initiated self-ignition combustion mode and the spark ignition combustion mode (the above-noted case (a)), the spark-initiated self-ignition combustion mode is selected when the engine is operated on a low or medium load. In this case, the low-RON fuel is used in a low load operation of the engine and the intermediate-octane value fuel is used in a medium load operation of the engine. Further, the spark ignition combustion mode is selected when the engine is operated on a high load using the high-RON fuel.

By switching the engine operation mode between the spark-initiated self-ignition combustion and the spark ignition combustion mode using fuel as explained above, a compression ratio of the engine can be lowered and, thereby, the engine construction can be smaller in size and lighter in weight and the engine can be operated more quiet.

When the engine operation mode is switched between the self-ignition combustion mode and the spark-initiated self-ignition combustion mode (the above-noted case (b)), the self-ignition combustion mode is selected when the engine is operated on a low load and, the spark-initiated self-ignition combustion mode is selected when the engine is operated on a medium or high load.

In this case, the low-RON fuel is used for the self-ignition combustion mode operation of the engine and the intermediate-octane value fuel and the high-RON fuel are used for a medium load operation and the high load operation of the engine, respectively, during the spark-initiated self-ignition combustion mode operation.

By switching the engine operation mode between the self-ignition combustion and the spark-initiated self-ignition combustion mode using fuel as explained above, a compression ratio of the engine can be increased and, thereby, the efficiency of the engine can be increased and, a smooth switching between the operation modes can be obtained.

Furthermore, the engine can be operated solely in the spark-initiated self-ignition combustion mode over the entire operating region by selecting fuel in accordance with the engine load. In this case, the low-RON fuel is used in a low load operation and the high-RON fuel is used in a high load operation. The intermediate-octane value fuel is used in an intermediate load operation of the engine. Since the engine is operated solely in the spark-initiated self-ignition combustion mode in this case, the switching of the engine operation mode is not required and the control of the engine is largely simplified.

In the separator device 10, the high-RON fuel and the low-RON fuel are obtained by selective permeation of the aromatic component of the material fuel through the separation membrane 101. In general, crude oil that is a raw material of gasoline contains sulfur, and almost the entire amount of sulfur in crude oil is removed in the process of gasoline purification. However, since an ordinary desulfurizing process cannot remove all the sulfur in crude oil, a small amount of sulfur component remains in a product gasoline. However, it has been found that if a material fuel is separated into a high-RON fuel and a low-RON fuel by using the separation membrane 101 that selectively allows the aromatic component of the material fuel to permeate, most of the sulfur remaining in the gasoline moves to the high-RON fuel side and the sulfur content of the low-RON fuel becomes very low. The reason for this phenomenon is not completely clear at present. However, it is, for example, possible that a most portion of the sulfur remaining in the gasoline is in a form bound to an aromatic component, and permeates together with the aromatic component through the separation membrane 101 in the separator device 10, or it is possible that sulfur remains in the gasoline in a different form of, for example, thiophene ($C_4H_4S$) or the like, and the substance, such as thiophene or the like, permeates through the separation membrane with a higher precedence, similarly to the aromatic component, etc. In any case, it has been found that most of the sulfur in the material fuel actually moves to the high-RON fuel side in the separator device and the sulfur content of the low-RON fuel becomes very low.

If sulfur is contained in fuel, an engine equipped with an exhaust purifying catalyst (for example 1a, FIG. 1) in an exhaust passage may experience generally-termed sulfur poisoning in some cases. In particular, in the case of a $NO_x$ storage-reduction type exhaust purifying catalyst that absorbs $NO_x$ from exhaust during a lean air-fuel ratio operation, and that releases absorbed $NO_x$, and that removes it through reduction, $SO_x$ produced by combustion of sulfur in fuel is absorbed into the catalyst together with $NO_x$ in exhaust. However, since the $SO_x$ component stored in the catalyst forms a stable compound, the $SO_x$ component cannot be released from the catalyst merely by setting a rich air-fuel ratio, unless the catalyst has a relatively high temperature (e.g., 500° C. or higher). Therefore, if a sulfur component is contained in fuel, sulfur gradually accumulates in the catalyst, so that the $NO_x$ absorption-storage capability of the catalyst decreases by an amount corresponding to the amount of sulfur accumulated, thus causing sulfur poisoning.

Therefore, occurrence of sulfur contamination due to accumulation of $SO_x$ can be prevented, for example, as follows. That is, the catalyst temperature of the engine (or the exhaust temperature substantially equal to the catalyst temperature) is directly detected (or the exhaust temperature may be estimated based on the operation condition of the engine, such as load, revolution speed, etc., since the operation condition of the engine and the exhaust temperature have a correlation). If the catalyst temperature or the exhaust temperature is lower than the temperature for $SO_x$ release from the catalyst mentioned above (e.g., 500° C.), a low-RON fuel having a very low sulfur content is used to prevent sulfur contamination. In this case, in a region where the catalyst temperature is at least the $SO_x$ release temperature, the $SO_x$ component is released from the catalyst, and does not accumulate in the catalyst. Therefore, during a high-output operation where the catalyst temperature (exhaust temperature) is higher than the $SO_x$ release temperature, the engine output can be increased by using the high-RON fuel instead of the low-RON fuel.

Next described will be other embodiments of the method of supplying a fuel separated by the separator device to the engine.

In the embodiments illustrated in FIGS. 1, 5, 6 and 7, the change between the high-RON fuel and the low-RON fuel, production of the intermediate-RON fuel, and supply thereof are performed by using the dual delivery pipe 20 and a single direct-cylinder fuel injection valve 110 equipped with the fuel switching mechanism 21.

However, the method of supplying fuel to the engine is not limited to the aforementioned method. It is also possible to provide direct-cylinder fuel injection valves dedicated to the fuels separately (that is, two direct-cylinder fuel injection valves for each cylinder). Furthermore, if separate fuel injection valves are provided, it is also possible to provide one of the two fuel injection valves for each cylinder as a port fuel injection valve that injects fuel into an intake port of the cylinder, instead of providing the two fuel injection valves as direct-cylinder fuel injection valves.

Furthermore, in the foregoing embodiments, two apparatus constructions in which the high-pressure low-RON fuel flowing out of the separator device 10 is directly supplied to the delivery pipe (FIGS. 1, 6 and 7), and in which the low-RON fuel is temporarily stored in the subsidiary tank 7 before being supplied to the engine (FIG. 5) are described. The fuel supply method to be adopted also varies depending on such apparatus construction.

Figure 8:
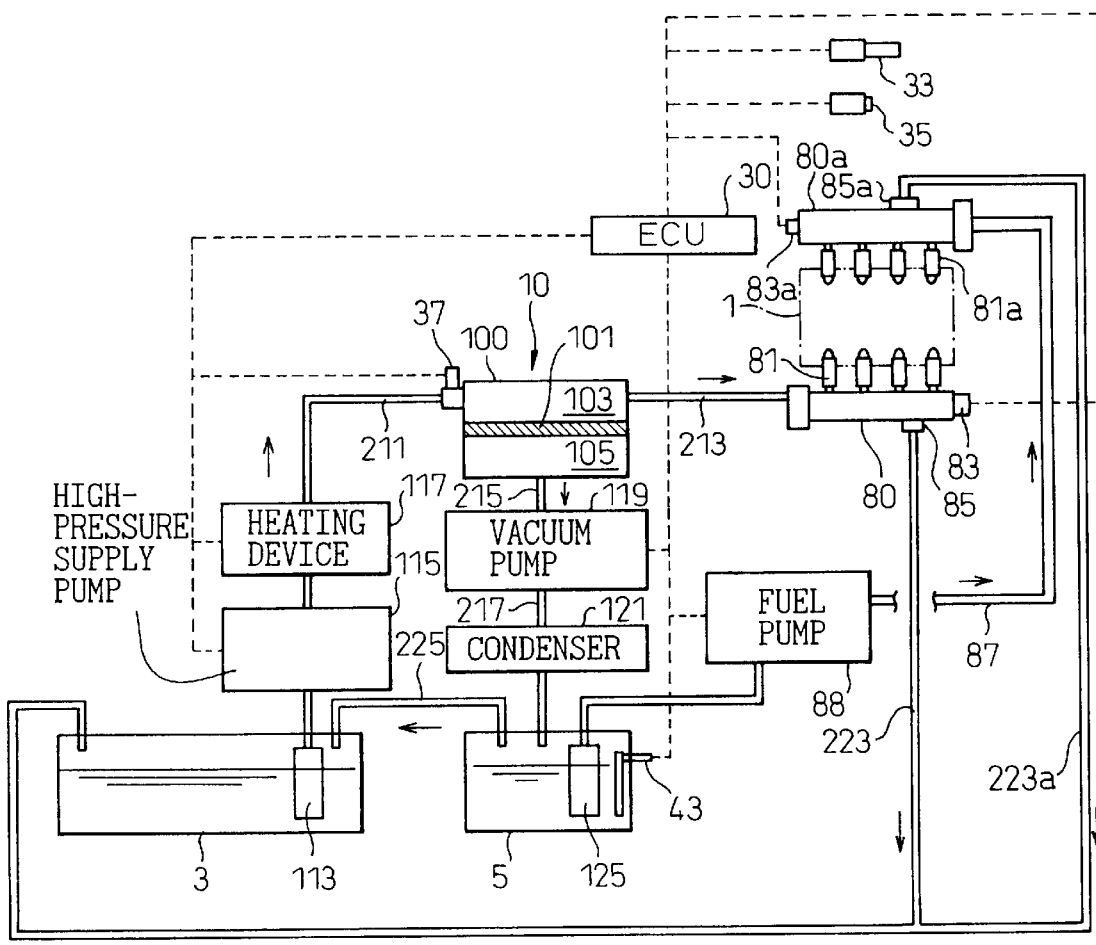
FIG. 8 is a diagram schematically illustrating a construction of an embodiment of the fuel supply apparatus of the invention different from the ones shown in FIGS. 1, 5, 6 and 7.
Figure 9:
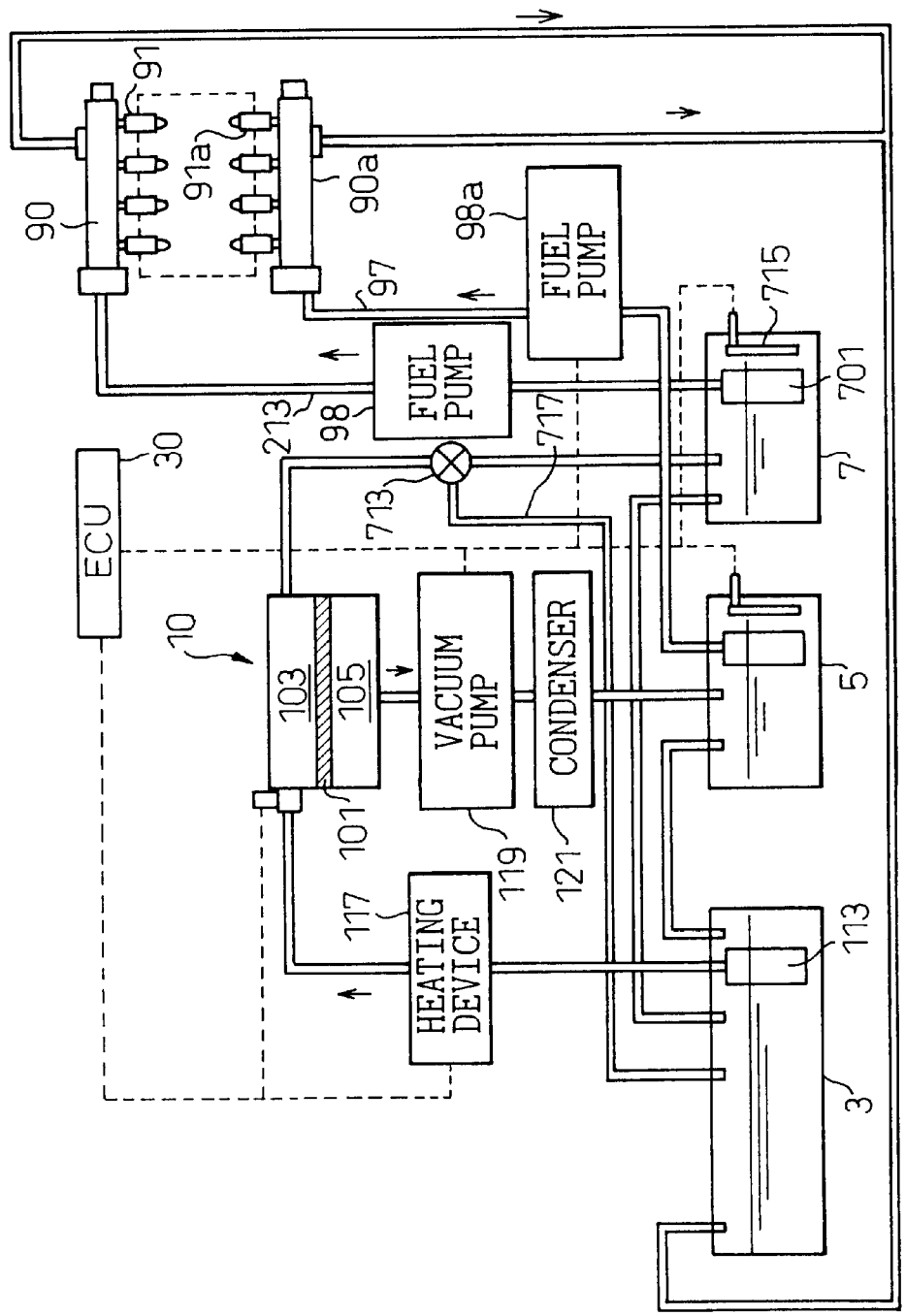
FIG. 9 is a diagram schematically illustrating a construction of an embodiment of the fuel supply apparatus of the invention different from the ones shown in FIGS. 1, 5, 6, 7 and 8.

The kinds of methods of supplying fuel to the engine will be described separately for a case where the low-RON fuel (the separated fuel having a high pressure at an outlet of the separator device) is directly supplied to the delivery pipe (FIG. 8), and a case where the low-RON fuel, after coming out of the separator device, is temporarily stored in a subsidiary tank (FIG. 9).

FIG. 8 is a diagram similar to FIG. 1, illustrating a fuel supplying method for a case where the low-RON fuel is directly supplied from the engine. In FIG. 8, the same reference numerals as in FIG. 1 represent elements comparable to those in FIG. 1.

In FIG. 8, the internal combustion engine 1 is provided with two fuel injection valves (81 and 81a) for each cylinder. In FIG. 8, the two fuel injection valves 81, 81a of each cylinder are both direct-cylinder fuel injection valves that inject fuel directly into the cylinder. The two fuel injection valves 81, 81a of each cylinder inject fuels supplied from delivery pipes 80 and 80a into the cylinder. In FIG. 8, 83, 83a represent fuel pressure sensors that detect the fuel pressures in the delivery pipes 80, 80a, and 85, 85a represent relief valves which, when the fuel pressures in the delivery pipes 80, 80a exceed a predetermined set value, are opened to return the fuels in the delivery pipes 80, 85a to the material fuel tank 3 via the return passages 223, 223a.

In FIG. 8, the high-pressure low-RON fuel is supplied directly from the separator device 10 to the delivery pipe 80, and the high-RON fuel that is supplied to the delivery pipe 80a via a fuel supply piping 87 after being temporarily stored in the subsidiary tank 5 and then being pressurized by a fuel pump 88. In this case, the fuel pump 88 is a high-pressure pump that raises the fuel pressure to a pressure sufficient for direct-cylinder fuel injection.

That is, in this embodiment, the low-RON fuel is directly supplied from the separator device to the delivery pipe 80, and then is injected from the fuel injection valves 81 into the corresponding cylinders. The high-RON fuel, after being temporarily stored in the subsidiary tank 5, is pressurized by the fuel pump (high-pressure fuel pump) 88, and is then supplied to the delivery pipe 80a, and is injected from the fuel injection valves 81a into the corresponding cylinders.

Since the low-RON fuel and the high-RON fuel are supplied into each cylinder via the separate fuel injection valves as described above, it becomes possible to instantly perform the switching from the low-RON fuel to the high-RON fuel or from the high-RON fuel to the low-RON fuel if fuel injection is performed only via one of the two types of fuel injection valves. Thus, it becomes possible to switch the fuel octane value within a short time. Furthermore, the high-RON fuel and the low-RON fuel can be injected from the two types of fuel injection valves (81, 81a), respectively, in accordance with the state of operation of the engine, such as load, revolution speed, etc. Therefore, it becomes possible to adjust the octane value of fuel supplied to the engine in accordance with the state of operation of the engine.

In FIG. 8, since the low-RON fuel is directly supplied to the engine (delivery pipe) from the separator device 10, the low-RON fuel has a pressure that is substantially equal to the discharge pressure of the high-pressure supply pump 115 for the material fuel. Therefore, the low-RON fuel has a high pressure suitable for direct-cylinder fuel injection. On the other hand, the high-RON fuel, after being temporarily stored in the subsidiary tank 5, is pressurized by using the fuel pump 88, so that the high-RON fuel can be supplied to the engine at an arbitrary pressure. Therefore, if the high-RON fuel is injected into intake ports of the engine by using port fuel injection valves, it becomes possible to use a pump having a relatively low discharge pressure as the fuel pump 88 and also to reduce the cost of the fuel injection valves 81a. Therefore, the cost of the entire apparatus can be reduced in comparison with the case where direct-cylinder fuel injection valves are used as the fuel injection valves 81a. In this case, as the port fuel injection valves, it is possible to use a multi-point injector that injects fuel separately into the intake port of each cylinder, or to use a single-point injector that injects fuel injection to the entire intake manifold so as to supply fuel from the single fuel injection valve into the cylinders.

That is, if the low-RON fuel (high-pressure fuel) is directly supplied from the separator device 10 to the engine, two fuel supplying methods, as described below, are possible.

(1) Both the low-RON fuel and the high-RON fuel are supplied to the engine by using direct-cylinder fuel injection valves.

(In this case, the two fuels may be supplied via a single direct-cylinder fuel injection valve by using fuel injection valves each equipped with a fuel switching mechanism as in FIG. 1, or direct-cylinder fuel injection valves dedicated separately for the fuels may be provided as in FIG. 8.)

(2) The low-RON fuel is supplied to the engine from direct-cylinder fuel injection valves, and the high-RON fuel is supplied to the engine from port fuel injection valves.

In this case, as the port fuel injection valves for the high-RON fuel, a multi-point injector may be used or a single-point injector may be used.

FIG. 9 shows a case where the low-RON fuel is temporarily stored in a subsidiary tank 7, and is then pressurized by a fuel pump before being supplied to the engine. In FIG. 9, the same reference numerals as in FIGS. 1 and 5 represent comparable elements.

In FIG. 9, 7 represents a subsidiary tank for the low-RON fuel, and 98 represents a high-pressure fuel pump for the low-RON fuel, and 90, 91 represent a delivery pipe and direct-cylinder fuel injection valves, respectively, for the low-RON fuel. Furthermore, 5 represents a subsidiary tank for the high-RON fuel, and 98a represents a high-pressure fuel pump for the high-RON fuel, and 90a, 91a represent a delivery pipe and direct-cylinder fuel injection valves, respectively, for the high-RON fuel.

That is, in this case, the high-RON fuel and the low-RON fuel are pressurized to a high pressure suitable for direct-cylinder fuel injection by the separate high-pressure fuel pumps, and are supplied into the engine via their respective direct-cylinder fuel injection valves. However, if the low-RON fuel and the high-RON fuel are temporarily stored in the low-RON fuel subsidiary tank 7 and the high-RON fuel subsidiary tank 5 and the fuels are pressurized by using the fuel pumps as in FIG. 9, the pressure of fuel supplied to the engine can be arbitrarily set, so that selection is possible between direct-cylinder fuel injection and port injection with regard to each of the low-RON fuel and the high-RON fuel. Therefore, in a fuel supply apparatus in which the low-RON fuel and the high-RON fuel are temporarily stored in subsidiary tanks as in FIG. 9, it is possible to select any one of the following four kinds, as a fashion of injecting fuel into the engine.

(1) Both the low-RON fuel and the high-RON fuel are supplied into the engine by using direct-cylinder fuel injection valves. (In this case, as for the direct-cylinder fuel injection valves, fuel injection valves equipped with fuel switching mechanism may be used, as in FIG. 1, so that the two fuels are supplied to each cylinder by using a single direct-cylinder fuel injection valve, or direct-cylinder fuel injection valves dedicated separately to each of the fuels may be provided as in FIG. 8.)

(2) The low-RON fuel and the high-RON fuel are individually supplied into the engine by using port fuel injection valves. (In this case, as for the port fuel injection valves, it is possible to use one of or both of a multi-point injector and a single-point injector.)

(3) The low-RON fuel is supplied into the engine from direct-cylinder fuel injection valves, and the high-RON fuel is supplied into the engine from port fuel injection valves.

(4) The low-RON fuel is supplied into the engine from port fuel injection valves, and the high-RON fuel is supplied into the engine from direct-cylinder fuel injection valves.

Thus, since both the low-RON fuel and the high-RON fuel are temporarily stored in their respectively subsidiary tanks before being supplied to the engine, the freedom in selecting a fuel injection method increases, so that an optimum fuel injection method can be adopted in accordance with the type of engine, the use thereof, etc.

Furthermore, in a construction in which two kinds of fuels are supplied to an engine by using separate fuel injection valves (and separate fuel injection systems) as in FIGS. 8 and 9, the freedom in selecting a combination of fuels also increases. Therefore, it becomes possible to provide not only combinations of a low-RON fuel and a high-RON fuel but also combinations of any two kinds of fuels from a plurality of fuels having different octane values, such as a low-RON fuel, a high-RON fuel, an intermediate-RON fuel, a material fuel, etc., and to supply such a combination of fuels to the engine in accordance with the state of operation of the engine.

As stated above, according to the inventions described in the claims, common advantages of allowing an increase in engine output and an improvement in exhaust property are achieved by producing a high-octane fuel and a low-octane fuel from a material fuel through the use of a separation membrane and by using a fuel having an octane value corresponding to the engine operation condition.

What is claimed is:

1. A fuel supply apparatus for an internal combustion engine, comprising:
    a separation membrane for separating a fuel supplied as a material into a high-octane fuel containing a larger amount of high octane value components than a material fuel and a low-octane fuel containing a larger amount of low octane value components than the material fuel;
    a high-octane fuel supply passage and a low-octane fuel supply passage that are independent from each other and that are capable of supplying the high-octane fuel and the low-octane fuel after a separation, respectively, separately to the internal combustion engine;
    the fuel supply apparatus for the internal combustion engine being characterized by supplying one or both of the high-octane fuel and the low-octane fuel to the internal combustion engine in accordance with an engine operation condition;
    separation condition detecting means for detecting an operation condition of the separation membrane related to amounts of a post-separation high-octane fuel and a post-separation low-octane fuel produced or a property of a post-separation fuel; and
    separation processing control means for controlling the separation membrane operation condition so that the amount of one of the post-separation fuels produced becomes equal to a predetermined value or a property of one of the post-separation fuels becomes equals to a predetermined property.

2. A fuel supply apparatus for an internal combustion engine according to claim 1, wherein the separation membrane separates the material fuel by selectively allowing fuel components having a predetermined octane value range to permeate therethrough, and wherein the fuel supply apparatus further comprises permeability control means for controlling at least one of the amount of the fuel components having the predetermined octane value permeating the membrane and the property of the fuel after it permeates through the membrane;
    means for detecting an amount of at least one of a post-separation high-octane fuel and a post-separation low-octane fuel produced or a property of one of the post-separation high-octane fuel and the post-separation low-octane fuel; and
    separation processing control means for controlling the permeability control means so that the amount of one of the post-separation fuels produced becomes equal to a predetermined value or a property of one of the post-separation fuels becomes equals to a predetermined property.

3. A fuel supply apparatus for an internal combustion engine according to claim 1,
    wherein the material fuel is supplied to a side of the separation membrane, and a post-separation fuel passed through the separation membrane is recovered from another side of the separation membrane, and
    wherein the separation membrane operation condition includes at least one of a pressure that acts on a material fuel-supplied side of the separation membrane, a pressure that acts on a post-separation fuel-recovered side of the separation membrane, and an amount of the material fuel supplied.

4. A fuel supply apparatus for an internal combustion engine according to claim 1, wherein the operation condition of the separation membrane includes at least one of a temperature of the material fuel supplied to the separation membrane and a temperature of the separation membrane.

5. A fuel supply apparatus for an internal combustion engine comprising:
    a separation membrane for separating a fuel supplied as a material into a high-octane fuel containing a larger amount of high octane value components than a material fuel and a low-octane fuel containing a larger amount of low octane value components than the material fuel;
    a high-octane fuel supply passage and a low-octane fuel supply passage that are independent from each other and that are capable of supplying the high-octane fuel and the low-octane fuel after a separation, respectively, separately to the internal combustion engine,
    the fuel supply apparatus for the internal combustion engine being characterized by supplying one or both of the high-octane fuel and the low-octane fuel to the internal combustion engine in accordance with an engine operation condition,
    wherein the separation membrane separates the material fuel by selectively allowing fuel components having a predetermined octane value range to permeate therethrough, and wherein the fuel supply apparatus further comprises permeability control means for controlling at least one of the amount of the fuel components having the predetermined octane value permeating the membrane and the property of the fuel after it permeates through the membrane, and
    wherein the permeability control means controls the amount of the fuel component having the predetermined octane value or the property of the fuel after it permeates through the membrane by adjusting at least one of a pressure that acts on a material fuel-supplied side of the separation membrane, a pressure that acts on a post-separation fuel-recovered side of the separation membrane.

6. A fuel supply apparatus for an internal combustion engine, comprising:

a separation membrane for separating a fuel supplied as a material into a high-octane fuel containing a larger amount of high octane value components than a material fuel and a low-octane fuel containing a larger amount of low octane value components than the material fuel;

a high-octane fuel supply passage and a low-octane fuel supply passage that are independent from each other and that are capable of supplying the high-octane fuel and the low-octane fuel after a separation, respectively, separately to the internal combustion engine, the fuel supply apparatus for the internal combustion engine being characterized by supplying one or both of the high-octane fuel and the low-octane fuel to the internal combustion engine in accordance with an engine operation condition wherein at least one supply passage of the high-octane fuel supply passage and the low-octane fuel supply passage is provided with a temporary storage capacity portion for retaining the fuel that passes therethrough, wherein the storage capacity portion is a storage tank that is able to allow an amount of the separated fuel residing therein to change between a predetermined upper limit value and a predetermined lower limit value during an operation of the engine;

fuel amount detecting means for detecting an amount of a separated fuel stored in the storage tank; and refluxing means for continuing a fuel separating process of the separation membrane by refluxing one of the separated fuels separated by the separation membrane that needs to be stored in the storage tank to the material fuel, when the amount of the separated fuel detected increases to an upper limit value.

7. A fuel supply apparatus for an internal combustion engine, comprising:

a separation membrane for separating a fuel supplied as a material into a high-octane fuel containing a larger amount of high octane value components than a material fuel and a low-octane fuel containing a larger amount of low octane value components than the material fuel;

a high-octane fuel supply passage and a low-octane fuel supply passage that are independent from each other and that are capable of supplying the high-octane fuel and the low-octane fuel after a separation, respectively, separately to the internal combustion engine, the fuel supply apparatus for the internal combustion engine being characterized by supplying one or both of the high-octane fuel and the low-octane fuel to the internal combustion engine in accordance with an engine operation condition wherein at least one supply passage of the high-octane fuel supply passage and the low-octane fuel supply passage is provided with a temporary storage capacity portion for retaining the fuel that passes therethrough, wherein the storage capacity portion is a storage tank that is able to allow an amount of the separated fuel residing therein to change between a predetermined upper limit value and a predetermined lower limit value during an operation of the engine;

fuel amount detecting means for detecting an amount of a separated fuel stored in the storage tank; and refluxing means for continuing a fuel separating process of the separation membrane by refluxing one of the separated fuels separated by the separation membrane and other than a separated fuel that needs to be stored in the storage tank, to the material fuel, when the amount of the separated fuel detected decreases to a lower limit value.

8. A fuel supply apparatus for an internal combustion engine, comprising:

a separation membrane for separating a fuel supplied as a material into a high-octane fuel containing a larger amount of high octane value components than a material fuel and a low-octane fuel containing a larger amount of low octane value components than the material fuel;

a high-octane fuel supply passage and a low-octane fuel supply passage that are independent from each other and that are capable of supplying the high-octane fuel and the low-octane fuel after a separation, respectively, separately to the internal combustion engine, the fuel supply apparatus for the internal combustion engine being characterized by supplying one or both of the high-octane fuel and the low-octane fuel to the internal combustion engine in accordance with an engine operation condition wherein at least one supply passage of the high-octane fuel supply passage and the low-octane fuel supply passage is provided with a temporary storage capacity portion for retaining the fuel that passes therethrough, wherein the storage capacity portion is a storage tank that is able to allow an amount of the separated fuel residing therein to change between a predetermined upper limit value and a predetermined lower limit value during an operation of the engine;

fuel amount detecting means for detecting an amount of a separated fuel stored in the storage tank; and separation condition detecting means for detecting an operation condition of the separation membrane related to amounts of a post-separation high-octane fuel and a post-separation low-octane fuel produced or a property of a post-separation fuel; and separation processing control means for controlling the separation membrane operation condition so that the amount of one of the post-separation fuels produced becomes equal to a predetermined value based on the amount of the separated fuel in the storage tank.

9. A fuel supply apparatus for an internal combustion engine, comprising:

a separation membrane for separating a fuel supplied as a material into a high-octane fuel containing a larger amount of high octane value components than a material fuel and a low-octane fuel containing a larger amount of low octane value components than the material fuel;

a high-octancte fuel supply passage and a low-octane fuel supply passage that are independent from each other and that are capable of supplying the high-octane fuel and the low-octane fuel after a separation, respectively, separately to the internal combustion engine, the fuel supply apparatus for the internal combustion engine being characterized by supplying one or both of the high-octane fuel and the low-octane fuel to the internal combustion engine in accordance with an engine operation condition, wherein the separation membrane separates the material fuel by selectively allowing fuel components having a predetermined octane value range to permeate therethrough, and wherein the fuel supply apparatus further comprises permeability control means for controlling at least one of the amount of the fuel components having the predetermined octane value permeating the membrane and the property of the fuel after it permeates through the membrane;

a storage tank disposed on at least one supply passage of the high-octane fuel supply passage and the low-octane fuel supply passage and capable of retaining the separated fuel passing therethrough;

fuel amount detecting means for detecting an amount of a separated fuel stored in the storage tank; and separation processing control means for controlling the permeability control means so that the amount of one of the post-separation fuels produced becomes equal to a predetermined value based on the amount of the separated fuel in the storage tank.

10. A fuel supply apparatus for an internal combustion engine according to claim 9, further comprising:

fuel amount detecting means for detecting an amount of a separated fuel stored in the storage tank; and refluxing means for continuing a fuel separating process of the separation membrane by refluxing one of the separated fuels separated by the separation membrane that needs to be stored in the storage tank to the material fuel, when the amount of the separated fuel detected increases to an upper limit value.

11. A fuel supply apparatus for an internal combustion engine according to claim 9, further comprising:

fuel amount detecting means for detecting an amount of a separated fuel stored in the storage tank; and refluxing means for continuing a fuel separating process of the separation membrane by refluxing one of the separated fuels separated by the separation membrane and other than a separated fuel that needs to be stored in the storage tank, to the material fuel, when the amount of the separated fuel detected decreases to a lower limit value.

12. A fuel supply apparatus for an internal combustion engine according to claim 9, further comprising:

fuel amount detecting means for detecting an amount of a separated fuel stored in the storage tank; and separation condition detecting means for detecting an operation condition of the separation membrane related to amounts of a post-separation high-octane fuel and a post-separation low-octane fuel produced or a property of a post-separation fuel; and separation processing control means for controlling the separation membrane operation condition so that the amount of one of the post-separation fuels produced becomes equal to a predetermined value based on the amount of the separated fuel in the storage tank.

13. A fuel supply apparatus for an internal combustion engine, comprising:

a separation membrane for separating a fuel supplied as a material into a high-octane fuel containing a larger amount of high octane value components than a material fuel and a low-octane fuel containing a larger amount of low octane value components than the material fuel; and a high-octane fuel supply passage and a low-octane fuel supply passage that are independent from each other and that are capable of supplying the high-octane fuel and the low-octane fuel after a separation, respectively, separately to the internal combustion engine, the fuel supply apparatus for the internal combustion engine being characterized by supplying one or both of the high-octane fuel and the low-octane fuel to the internal combustion engine in accordance with an engine operation condition, wherein the internal combustion engine is capable of operating by switching between a stratified charge combustion mode in which a lean air-fuel ratio stratified charge combustion is performed by forming a mixture layer of air and a fuel of a combustible air-fuel ratio in a portion of a cylinder combustion chamber, and a homogeneous combustion mode in which a homogeneous mixture combustion is performed by forming a homogenous mixture in the cylinder combustion chamber, and wherein the fuel supply apparatus supplies the low-octane fuel to the engine when the engine is operated in the stratified charge combustion mode, and the fuel supply apparatus supplies the high-octane fuel to the engine when the engine is operated in the homogenous combustion mode.

14. A fuel supply apparatus for an internal combustion engine according to claim 13, wherein the separation membrane separates the material fuel by selectively allowing fuel components having a predetermined octane value range to permeate therethrough, and wherein the fuel supply apparatus further comprises permeability control means for controlling at least one of the amount of the fuel components having the predetermined octane value permeating the membrane and the property of the fuel after it permeates through the membrane.

15. A fuel supply apparatus for an internal combustion engine according to claim 13, wherein the fuel supply apparatus supplies the high-octane fuel to the engine when the engine is operated in the stratified charge combustion mode if the engine operation load is higher than a predetermined value.

16. A fuel supply apparatus for an internal combustion engine according to claim 15, wherein the separation membrane separates the material fuel by selectively allowing fuel components having a predetermined octane value range to permeate therethrough, and wherein the fuel supply apparatus further comprises permeability control means for controlling at least one of the amount of the fuel components having the predetermined octane value permeating the membrane and the property of the fuel after it permeates through the membrane.

17. A fuel supply apparatus for an internal combustion engine, comprising:

a separation membrane for separating a fuel supplied as a material into a high-octane fuel containing a larger amount of high octane value components than a material fuel and a low-octane fuel containing a larger amount of low octane value components than the material fuel; and a high-octane fuel supply passage and a low-octane fuel supply passage that are independent from each other and that are capable of supplying the high-octane fuel and the low-octane fuel after a separation, respectively, separately to the internal combustion engine, the fuel supply apparatus for the internal combustion engine being characterized by supplying one or both of the high-octane fuel and the low-octane fuel to the internal combustion engine in accordance with an engine operation condition, wherein the internal combustion engine is capable of operating by switching between a self-ignition combustion mode in which a fuel is self-ignited and burned in a cylinder combustion chamber, and a spark ignition combustion mode in which a mixture formed in the cylinder combustion chamber is ignited by a spark plug, and is burned, and wherein the fuel supply apparatus supplies the low-octane fuel to the engine when the engine is operated in the self-ignition combustion mode, and the fuel supply apparatus supplies the high-octane fuel to the engine when the engine is operated in the spark ignition combustion mode.

18. A fuel supply apparatus for an internal combustion engine according to claim 17, wherein the separation membrane separates the material fuel by selectively allowing fuel components having a predetermined octane value range to permeate therethrough, and wherein the fuel supply apparatus further comprises permeability control means for controlling at least one of the amount of the fuel components having the predetermined octane value permeating the membrane and the property of the fuel after it permeates through the membrane.

19. A fuel supply apparatus for an internal combustion engine, comprising:

a separation membrane for separating a fuel supplied as a material into a high-octane fuel containing a larger amount of high octane value components than a material fuel and a low-octane fuel containing a larger amount of low octane value components than the material fuel;

a high-octane fuel supply passage and a low-octane fuel supply passage that are independent from each other and that are capable of supplying the high-octane fuel and the low-octane fuel after a separation, respectively, separately to the internal combustion engine, the fuel supply apparatus for the internal combustion engine being characterized by supplying one or both of the high-octane fuel and the low-octane fuel to the internal combustion engine in accordance with an engine operation condition;

wherein the internal combustion engine is capable of operating by switching between at least one of a self-ignition combustion mode and a spark ignition combustion mode in which a fuel is self-ignited and burned in a cylinder combustion chamber and in which a mixture formed in the cylinder combustion chamber is ignited by a spark plug and is burned, respectively, and a spark-initiated self-ignition combustion mode in which a portion of a mixture formed in the cylinder is ignited by a spark plug and burned, and remaining portion of the mixture is self-ignited and burned gradually after the portion of the mixture ignited by the spark plug has burned; and wherein the fuel supply apparatus supplies the low-octane fuel to the engine when the engine is operated in the self-ignition combustion mode, and the fuel supply apparatus supplies the high-octane fuel to the engine when the engine is operated in the spark ignition combustion mode and the fuel supply apparatus supplies at least one of the low-RON fuel, the high-RON fuel and an intermediate-octane value fuel produced from the low-RON fuel and the high-RON fuel and having an intermediate octane value to the engine when the engine is operated in the spark-initiated self-ignition combustion mode.

20. A fuel supply apparatus for an internal combustion engine according to claim 19, wherein the separation membrane separates the material fuel by selectively allowing fuel components having a predetermined octane value range to permeate therethrough, and wherein the fuel supply apparatus further comprises permeability control means for controlling at least one of the amount of the fuel components having the predetermined octane value permeating the membrane and the property of the fuel after it permeates through the membrane.

21. A fuel supply apparatus for an internal combustion engine, comprising:

a separation membrane for separating a fuel supplied as a material into a high-octane fuel containing a larger amount of high octane value components than a material fuel and a low-octane fuel containing a larger amount of low octane value components than the material fuel;

a high-octane fuel supply passage and a low-octane fuel supply passage that are independent from each other and that are capable of supplying the high-octane fuel and the low-octane fuel after a separation, respectively, separately to the internal combustion engine, the fuel supply apparatus for the internal combustion engine being characterized by supplying one or both of the high-octane fuel and the low-octane fuel to the internal combustion engine in accordance with an engine operation condition, wherein the internal combustion engine is capable of operating in a spark-initiated self-ignition combustion mode in which a portion of a mixture formed in the cylinder is ignited by a spark plug and burned, and remaining portion of the mixture is self-ignited and burned gradually after the portion of the mixture ignited by the spark plug has burned; and wherein the fuel supply apparatus supplies at least one of the low-RON fuel, the high-RON fuel and an intermediate-octane value fuel produced from the low-RON fuel and the high-RON fuel and having an intermediate octane value to the engine when the engine is operated in the spark-initiated self-ignition combustion mode.

22. A fuel supply apparatus for an internal combustion engine according to claim 21 wherein the separation membrane separates the material fuel by selectively allowing fuel components having a predetermined octane value range to permeate therethrough, and wherein the fuel supply apparatus further comprises permeability control means for controlling at least one of the amount of the fuel components having the predetermined octane value permeating the membrane and the property of the fuel after it permeates through the membrane.

23. A fuel supply apparatus for an internal combustion engine, comprising:

a separation membrane for separating a fuel supplied as a material into a high-octane fuel containing a larger amount of high octane value components than a material fuel and a low-octane fuel containing a larger amount of low octane value components than the material fuel; and a high-octane fuel supply passage and a low-octane fuel supply passage that are independent from each other and that are capable of supplying the high-octane fuel and the low-octane fuel after a separation, respectively, separately to the internal combustion engine, the fuel supply apparatus for the internal combustion engine being characterized by supplying one or both of the high-octane fuel and the low-octane fuel to the internal combustion engine in accordance with an engine operation condition wherein the internal combustion engine is provided with an exhaust purifying catalyst in an exhaust system for purifying an exhaust from the engine, and wherein the fuel supply apparatus supplies the low-octane fuel to the engine when a temperature of the exhaust purifying catalyst during an operation of the engine is lower than a predetermined temperature.

24. A fuel supply apparatus for an internal combustion engine according to claim 23, wherein the separation membrane separates the material fuel by selectively allowing fuel components having a predetermined octane value range to permeate therethrough, and wherein the fuel supply apparatus further comprises permeability control means for controlling at least one of the amount of the fuel components having the predetermined octane value permeating the membrane and the property of the fuel after it permeates through the membrane.

* * * * *